(12) United States Patent  
Woodgate et al.

(10) Patent No.: US 8,159,739 B2
(45) Date of Patent: Apr. 17, 2012

(54) DISPLAY APPARATUS

(75) Inventors: Graham John Woodgate, Oxfordshire (GB); Jonathan Harrold, Warwickshire (GB)

(73) Assignee: Au Optronics Corporation, Hsin-Chu (TW)

( * ) Notice: Subject to any disclaimer, the term of this patent is extended or adjusted under 35 U.S.C. 154(b) by 990 days.

(21) Appl. No.: 12/128,873

(22) Filed: May 29, 2008

(65) Prior Publication Data

US 2008/0231690 A1    Sep. 25, 2008

Related U.S. Application Data

(63) Continuation of application No. 11/327,652, filed on Jan. 9, 2006.

(51) Int. Cl.
*G02B 26/00* (2006.01)
*G02F 1/03* (2006.01)
*G09G 3/00* (2006.01)
*H04N 15/00* (2006.01)

(52) U.S. Cl. .......... 359/290; 359/237; 359/256; 345/32; 348/42

(58) Field of Classification Search .................. 359/237, 359/245–246, 248–254, 256, 279, 320, 618; 345/32–33; 348/40–42
See application file for complete search history.

(56) References Cited

U.S. PATENT DOCUMENTS

| | | | |
|---|---|---|---|
| 4,717,949 A | 1/1988 | Eichenlaub | |
| 4,959,641 A | 9/1990 | Bass et al. | |
| 5,969,850 A | 10/1999 | Harrold et al. | |
| 6,069,650 A | 5/2000 | Battersby | |
| 6,108,029 A | 8/2000 | Lo | |
| 6,490,094 B2 * | 12/2002 | Daniell | 359/622 |
| 7,058,252 B2 | 6/2006 | Woodgate et al. | |
| 7,215,475 B2 | 5/2007 | Woodgate et al. | |
| 2004/0218245 A1 | 11/2004 | Kean et al. | |
| 2004/0240777 A1 | 12/2004 | Woodgate et al. | |

FOREIGN PATENT DOCUMENTS

EP         0 721 131         7/1996
(Continued)

OTHER PUBLICATIONS

Berkel, C.V., et al.; "Multiview 3D-LCD;"Proc of SPIE, vol. 2653, 1996, pp. 32-39.

(Continued)

*Primary Examiner* — Dawayne A Pinkney
(74) *Attorney, Agent, or Firm* — Thomas, Kayden, Horstemeyer & Risley, LLP

(57) ABSTRACT

A display apparatus comprises a spatial light modulator and optical elements in series therewith. The optical elements provide a first parallax element being a parallax barrier capable of directing light output from the display apparatus into a first plurality of viewing windows, and a second parallax element capable of directing light output from the display apparatus into a second plurality of viewing windows. In a first mode, the first and second parallax elements have substantially no directional effect on the light output from the display apparatus. In a second mode, the first parallax element directs light output from the display apparatus into the first plurality of viewing windows and the second optical element has substantially no directional effect. In a third mode, the second optical element directs light output from the display apparatus into the second plurality of viewing windows and the first parallax element has substantially no directional effect.

29 Claims, 16 Drawing Sheets

FOREIGN PATENT DOCUMENTS

| | | |
|---|---|---|
| EP | 0 829 743 | 3/1998 |
| EP | 0 829 744 | 3/1998 |
| EP | 0 833 183 | 4/1998 |
| GB | 2 317 295 | 3/1998 |
| GB | 2 403 815 | 1/2005 |
| WO | WO 98/21620 | 5/1998 |
| WO | WO 03/015424 | 2/2003 |
| WO | WO 2004/070451 | 8/2004 |

OTHER PUBLICATIONS

Contoret, A.E., et al.; "Polarized Electroluminescence from a Anisotropic Nematic Network on a Non-Contact Photoalignment Layer;" Advanced Materials, vol. 12, No. 13, 2000, pp. 971-974.

Eichenlaub, J.B.; "Developments in Autostereoscopic Technology at Dimension Technologies Inc.;" Proc of SPIE, vol. 1915, 1993, pp. 177-186.

Hamagishi, G., et al.; "Invited Paper: A Display System with 2-D/3-D Compatability;" Proc. SID, 1998, pp. 915-918.

LG Commander, et al.; "Electrode Designs for Tunable Microlenses;" Micolens Arrays, EOS Topical Meeting, 1997, vol. 13, pp. 48-58.

Okoshi, T.; "Three-Dimensional Imaging Techniques;" Academic Press, 1976.

Suyama, S., et al.; "3-D Display System with Dual-Frequency Liquid-Crystal Varifocal Lens;" SID 97 Digest, pp. 273-276.

Woodgate, G.J., et al.; "Flat Panel Autostereoscopic Displays-Characterisation and Enhancement;" Proc of SPIE, vol. 3957, 2000, pp. 153-164.

Woodgate, et al.; Non-Final Office Action, mailed Sep. 25, 2007; filed Jan. 9, 2006, U.S. Appl. No. 11/327,652.

* cited by examiner

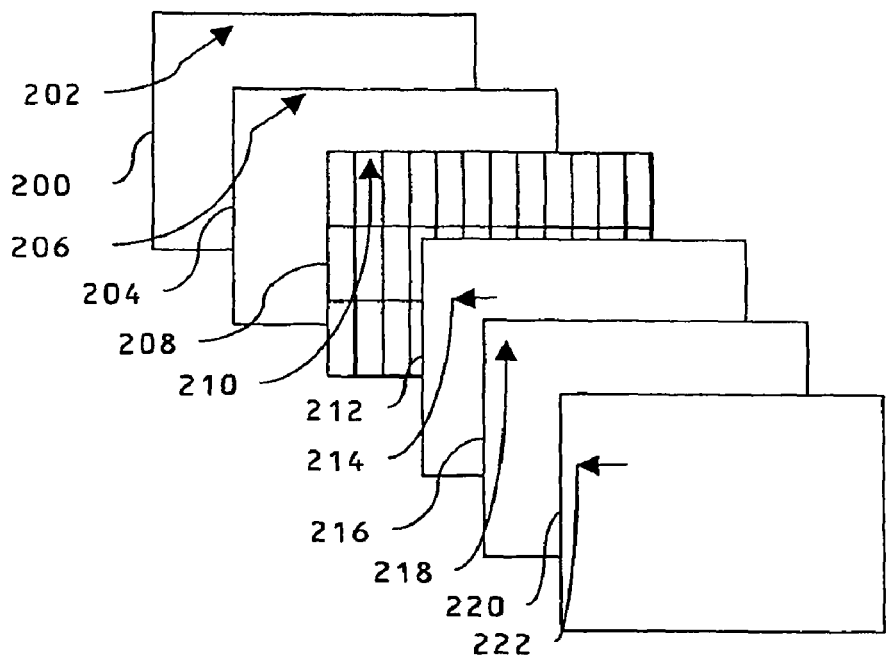
FIG.10
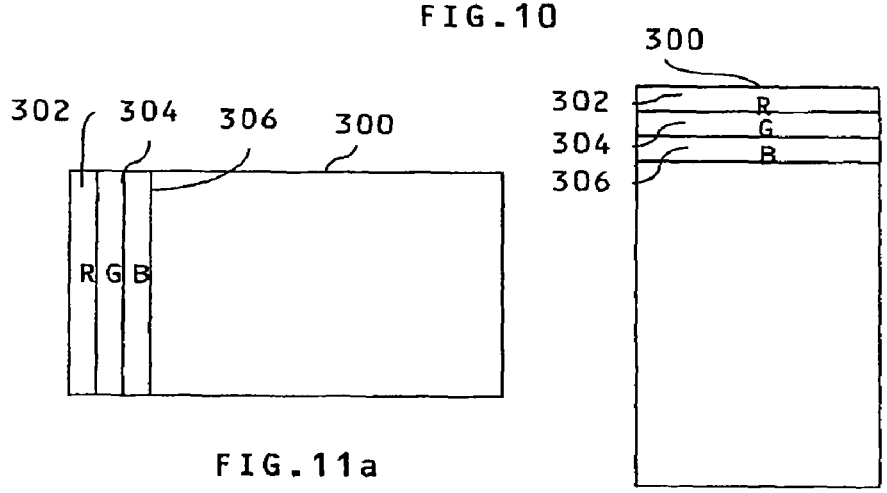
FIG.11a
FIG.11b
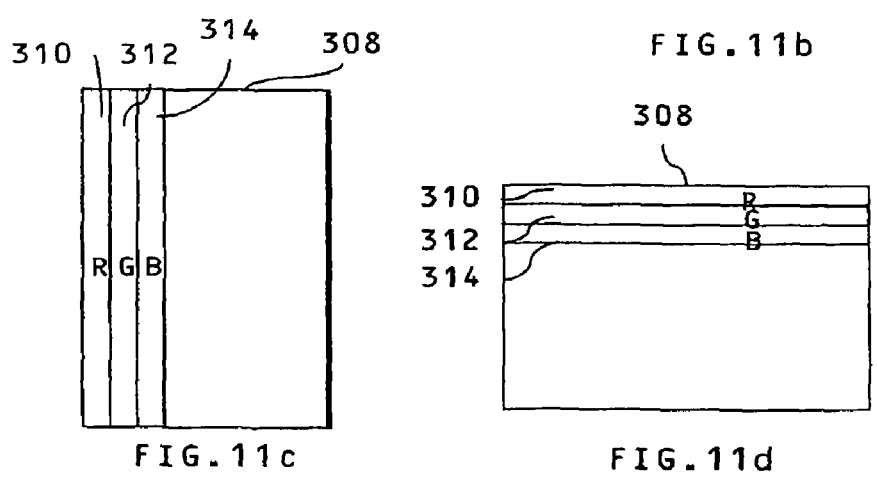
FIG.11c
FIG.11d

DISPLAY APPARATUS

CROSS-REFERENCE TO RELATED APPLICATION

This application is a continuation of U.S. patent application Ser. No. 11/327,652 filed Jan. 9, 2006, which claims the benefit of United Kingdom application Serial No. 0500420.5, filed Jan. 10, 2005, the subject matter of which is incorporated herein by reference.

FIELD OF THE INVENTION

The present invention relates to display apparatuses for displaying an image. Such an apparatus may be used in a switchable two dimensional (2D)/three dimensional (3D) autostereoscopic display apparatus; for a switchable high brightness reflective display system; for a multi-user display system; or for a directional lighting system. Such systems may be used in computer monitors, telecommunications handsets, digital cameras, laptop and desktop computers, games apparatuses, automotive and other mobile display applications.

DESCRIPTION OF RELATED ART 3D displays

Normal human vision is stereoscopic, that is each eye sees a slightly different image of the world. The brain fuses the two images (referred to as the stereo pair) to give the sensation of depth. Three dimensional stereoscopic displays replay a separate, generally planar, image to each of the eyes corresponding to that which would be seen if viewing a real world scene. The brain again fuses the stereo pair to give the appearance of depth in the image.

FIG. 1a shows in plan view a display surface in a display plane 1. A right eye 2 views a right eye homologous image point 3 on the display plane and a left eye 4 views a left eye homologous point 5 on the display plane to produce an apparent image point 6 perceived by the user behind the screen plane.

FIG. 1b shows in plan view a display surface in a display plane 1. A right eye 2 views a right eye homologous image point 7 on the display plane and a left eye 4 views a left eye homologous point 8 on the display plane to produce an apparent image point 9 in front of the screen plane.

FIG. 1c shows the appearance of the left eye image 10 and right eye image 11. The homologous point 5 in the left eye image 10 is positioned on a reference line 12. The corresponding homologous point 3 in the right eye image 11 is at a different relative position 3 with respect to the reference line 12. The separation 13 of the point 3 from the reference line 12 is called the disparity and in this case is a positive disparity for points which will lie behind the screen plane.

For a generalised point in the scene there is a corresponding point in each image of the stereo pair as shown in FIG. 1a. These points are termed the homologous points. The relative separation of the homologous points between the two images is termed the disparity; points with zero disparity correspond to points at the depth plane of the display. FIG. 1b shows that points with uncrossed disparity appear behind the display and FIG. 1c shows that points with crossed disparity appear in front of the display. The magnitude of the separation of the homologous points, the distance to the observer, and the observer's interocular separation gives the amount of depth perceived on the display.

Stereoscopic type displays are well known in the prior art and refer to displays in which some kind of viewing aid is worn by the user to substantially separate the views sent to the left and right eyes. For example, the viewing aid may be colour filters in which the images are colour coded (e.g. red and green); polarising glasses in which the images are encoded in orthogonal polarisation states; or shutter glasses in which the views are encoded as a temporal sequence of images in synchronisation with the opening of the shutters of the glasses.

Autostereoscopic displays operate without viewing aids worn by the observer. In autostereoscopic displays, each of the views can be seen from a limited region in space as illustrated in FIG. 2. A parallax element is used, being an element capable of directing light into a plurality of viewing windows. The parallax element may be, for example, a parallax barrier or an array of lenses such as formed by a lenticular screen.

FIG. 2a shows a display apparatus 16 with an attached parallax optical element 17. The display apparatus 16 produces a right eye image 18 for the right eye channel. The parallax optical element 17 directs light in a direction shown by the arrow 19 to produce a right eye viewing window 20 in the region in front of the display. An observer places their right eye 22 at the position of the window 20. The position of the left eye viewing window 24 is shown for reference. The viewing window 20 may also be referred to as a vertically extended optical pupil.

FIG. 2b shows the left eye optical system. The display apparatus 16 produces a left eye image 26 for the left eye channel. The parallax optical element 17 directs light in a direction shown by the arrow 28 to produce a left eye viewing window 30 in the region in front of the display. An observer places their left eye 32 at the position of the window 30. The position of the right eye viewing window 20 is shown for reference.

The system comprises a display and an optical steering mechanism. The light from the left image 26 is sent to a limited region in front of the display, referred to as the viewing window 30. If an eye 32 is placed at the position of the viewing window 30 then the observer sees the appropriate image 26 across the whole of the display 16. Similarly the optical system sends the light intended for the right image 18 to a separate window 20. If the observer places their right eye 22 in that window then the right eye image will be seen across the whole of the display. Generally, the light from either image may be considered to have been optically steered (i.e. directed) into a respective directional distribution.

FIG. 3 shows in plan view a display apparatus 16,17 in a display plane 34 producing the left eye viewing windows 36, 37, 38 and right eye viewing windows 39, 40, 41 in the window plane 42. The separation of the window plane from the display is termed the nominal viewing distance 43. The windows 37,40 in the central position with respect to the display are in the zeroth lobe 44. Windows 36, 39 to the right of the zeroth lobe 44 are in the +1 lobe 46, while windows 38,41 to the left of the zeroth lobe are in the −1 lobe 48.

The viewing window plane of the display represents the distance from the display at which the lateral viewing freedom is greatest. For points away from the window plane, there is a diamond shaped autostereoscopic viewing zone, as illustrated in plan view in FIG. 3. As can be seen, the light from each of the points across the display is beamed in a cone of finite width to the viewing windows. The width of the cone may be defined as the angular width.

If an eye is placed in each of a pair viewing zones such as 37,40 then an autostereoscopic image will be seen across the whole area of the display. To a first order, the longitudinal viewing freedom of the display is determined by the length of these viewing zones.

The variation in intensity 50 across the window plane of a display (constituting one tangible form of a directional distribution of the light) is shown with respect to position 51 for idealised windows in FIG. 4a. The right eye window position intensity distribution 52 corresponds to the window 41 in FIG. 3, and intensity distribution 53 corresponds to the window 37, intensity distribution 54 corresponds to the window 40 and intensity distribution 55 corresponds to the window 36.

FIG. 4b shows the intensity distribution with position schematically for more realistic windows. The right eye window position intensity distribution 56 corresponds to the window 41 in FIG. 3, and intensity distribution 57 corresponds to the window 37, intensity distribution 58 corresponds to the window 40 and intensity distribution 59 corresponds to the window 36.

The quality of the separation of images and the extent of the lateral and longitudinal viewing freedom of the display is determined by the window quality, as illustrated in FIG. 4. FIG. 4a shows the ideal viewing windows while FIG. 4b is a schematic of the actual viewing windows that may be outputted from the display. Several artifacts can occur due to inadequate window performance. Cross talk occurs when light from the right eye image is seen by the left eye and vice versa. This is a significant 3D image degradation mechanism which can lead to visual strain for the user. Additionally, poor window quality will lead to a reduction in the viewing freedom of the observer. The optical system is designed to optimised the performance of the viewing windows.

Parallax Barrier Displays

One type of well known flat panel autostereoscopic display comprises a backlight, an array of electronically adjustable pixels (known as a Spatial Light Modulator, SLM) arranged in columns and rows and a parallax barrier attached to the front of the display as illustrated in plan view in FIG. 5.

A backlight 60 produces a light output 62 which is incident on an LCD input polariser 64. The light is transmitted through a TFT LCD substrate 66 and is incident on a repeating array of pixels arranged in columns and rows in an LCD pixel plane 67. The red pixels 68,71,74, green pixels 69,72,75 and blue pixels 70,73 each comprise an individually controllable liquid crystal layer and are separated by regions of an opaque mask called a black mask 76. Each pixel comprises a transmissive region, or pixel aperture 78. Light passing through the pixel is modulated in phase by the liquid crystal material in the LCD pixel plane 67 and in colour by a colour filter positioned on an LCD colour filter substrate 80. The light then passes through an output polariser 82 after which is placed a parallax barrier 84 and a parallax barrier substrate 86. The parallax barrier 84 comprises an array of vertically extended transmissive regions 92 separated by vertically extended opaque regions 93 and serves to direct light from alternate pixel columns 69,71,73,75 to the right eye as shown by the ray 88 for light from pixel 69 and from the intermediate columns 68,70,72,74 to the left eye as shown by the ray 90 (this overall light direction pattern forming another example of a directional distribution of light). The observer sees the light from the underlying pixel illuminating the aperture of the barrier, region 92.

In this document, an SLM includes both 'light valve' devices such as liquid crystal displays and emissive devices such as electroluminescent displays and LED displays.

The pixels of the display are arranged as rows and columns separated by gaps, (generally defined by the black mask 76 in a liquid crystal display, LCD) with the parallax barrier being an array of vertically extended slit regions 92 of pitch close to twice the pitch of the pixel columns. The parallax barrier limits the range of angles from which light from each pixel column can be seen, thus creating the viewing windows at a region in front of the display. The angles of the output cone from the display are determined by the width and shape of the pixel aperture and the alignment and aberrations of the parallax barrier.

In order to steer the light from each pixel to the viewing window, the pitch of the parallax barrier is slightly smaller than twice the pitch of the pixel array. This condition is known as 'viewpoint correction'. In such a display, the resolution of each of the stereo pair images is half the horizontal resolution of the base LCD, and two views are created.

Thus, the light from the odd columns of pixels 68,70,72,74 can be seen from the left viewing window, and the light from the even columns of pixels 69,71,73,75 can be seen from the right viewing window. If the left eye image data is placed on the odd columns of the display and the right eye image data on the even columns then the observer in the correct 'orthoscopic' position should fuse the two images to see an autostereoscopic 3D image across the whole of the display.

There will be light leakage between the two views such that some of the left eye view will be seen by the right eye and vice versa. This leakage is termed image cross-talk. Cross talk is an important mechanism for generating visual strain when viewing 3D displays, and its control is a major driver in 3D display development. For flat panel autostereoscopic displays (in particular those based on LCD technology), the limitation to window performance is generally determined by the shape and aperture ratio of the pixel and the quality of the optical element.

In a parallax barrier type display, the columns directly under the slits are imaged to a first pair of windows in the zeroth lobe of the display. The adjacent pixel columns are also imaged to viewing windows, in +1 and −1 lobes of the display. Thus as can be seen in FIG. 3, if the user moves laterally outside the orthoscopic zone then light from the incorrect image will be sent to each eye. When the right eye sees the left eye view and vice versa, the image is termed 'pseudoscopic', compared to the correct orthoscopic condition.

In order to increase the lateral viewing freedom of the display, more than two pixel columns can be placed under each slit of the barrier. For example, four columns will create four windows in which the view is changed for each window. Such a display will give a 'look-around' appearance as the observer moves. The longitudinal freedom is also increased by such a method. However, in this case, the resolution of the display is limited to one quarter of the resolution of the base panel.

Parallax barriers rely on blocking the light from regions of the display and therefore reduce the brightness and device efficiency, generally to approximately 20-40% of the original display brightness.

Parallax barriers are not readily removed and replaced due to the requirements of sub-pixel alignment tolerances of the barrier with respect to the pixel structure of the display in order to optimise the viewing freedom of the display. The 2D mode is half resolution.

Parallax Barrier Optical Components

One type of parallax barrier display in which the parallax barrier elements are placed in front of the display device is disclosed in T. Okoshi "Three Dimensional Imaging Techniques", Academic Press 1976.

In another type of a parallax barrier display, the parallax elements may be embodied as slits behind the display, as disclosed in G. Hamagishi et al "A Display System with 2D/3D compatibility", Proc. SID 1998 pp 915-918. It can be shown that such a display suffers from Fresnel diffraction artifacts, limiting the quality of the viewing windows that can be obtained.

In another type of a parallax barrier display, the parallax elements may be embodied as light lines interspersed by dark regions as disclosed in U.S. Pat. No. 4,717,949. It can be shown that such a display suffers from Fresnel diffraction artifacts, limiting the quality of the viewing windows that can be obtained, G. Woodgate et al Proc. SPIE Vol. 3957 "Flat panel autostereoscopic displays—characterisation and enhancement" pp 153-164, 2000.

Lenticular Displays

Another type of parallax optic (cf. parallax barriers) well known in the art for use in stereoscopic displays is called the lenticular screen, which is an array of vertically extended cylindrical microlenses. The term "cylindrical" as used herein has its normal meaning in the art and includes not only strictly spherical lens shapes but also aspherical lens shapes. The pitch of the lenses again corresponds to the viewpoint correction condition. The curvature of the lenses is set substantially so as to produce an image of the LCD pixels at the window plane. As the lenses collect the light in a cone from the pixel and distribute it to the windows, lenticular displays have the full brightness of the base panel.

FIG. 6 shows the structure of a prior art lenticular display apparatus. The apparatus is configured as described in FIG. 5 up to the output polariser 82. The light then passes through a lenticular screen substrate 94 and a lenticular screen 96 which is formed on the surface of the lenticular screen substrate 94. As for the parallax barrier, the lenticular screen 96 serves to direct light from alternate pixel columns 69,71,73,75 to the right eye as shown by the ray 88 from the pixel 69 and from the intermediate columns 68,70,72,74 to the left eye as shown by the ray 90 from pixel 68. The observer sees the light from the underlying pixel illuminating the aperture of the individual lenticule, 98 of the lenticular screen 96. The extent of the captured light cone is shown by the captured rays 100.

Lenticular displays are described in T. Okoshi "Three Dimensional Imaging Techniques", Academic Press, 1976. One type of lenticular display using a spatial light modulator is described in U.S. Pat. No. 4,959,641. The invention of '641 describes non-switching lenticular elements in air.

Such a display may suffer from undesirable visibility of the lens surface due to reflections and scatter at and near to the lenses 96 which will degrade the contrast of the image. Reflections could be for example due to Fresnel reflections.

Extended Viewing Freedom

The viewing freedom of the flat panel displays described above is limited by the window structure of the display.

A display in which the viewing freedom is enhanced by measuring the position of an observer and moving the parallax element in correspondence is described in EP0 829 743. Such an observer measurement apparatus and mechanical actuation is expensive and complex.

A display in which the window optical structure is not varied (a fixed parallax optic display for example) and the image data is switched in correspondence to the measured position of the observer such that the observer maintains a substantially orthoscopic image is described for example in EP072 113 1.

A lenticular display using cylindrical lenses that are tilted with respect to columns of pixels of a display is described in "Multiview 3D—LCD" published in SPIE Proceedings Vol. 2653, 1996, pages 32 to 39.

2D-3D Switchable Displays

As described above, the use of parallax optics to generate a spatially multiplexed 3D display limits the resolution of each image to at best half of the full display resolution. In many applications, the display is intended to be used for a fraction of the time in the 3D mode, and is required to have a full resolution artifact free 2D mode.

One type of display in which the effect of the parallax optic is removed is Proc. SPIE vol. 1915 Stereoscopic Displays and Applications IV (1993) pp 177-186, "Developments in Autostereoscopic Technology at Dimension Technologies Inc.", 1993. In this case, a switchable diffuser element is placed in the optical system used to form the light lines. Such a switchable diffuser could be for example of the Polymer Dispersed Liquid Crystal type in which the molecular arrangement switches between a scattering and non-scattering mode on the application of an applied voltage across the material. In the 3D mode, the diffuser is clear and light lines are produced to create the rear parallax barrier effect. In the 2D mode, the diffuser is scattering and the light lines are washed out, creating the effect of a uniform light source. In this way, the output of the display is substantially Lambertian and the windows are washed out. An observer will then see the display as a full resolution 2D display. Such a display suffers from Fresnel diffraction artifacts in the 3D mode, as well as from unwanted residual scatter in the diffuser's clear state which will increase the display cross-talk. Therefore, such a display is likely to exhibit higher levels of visual strain.

In another type of switchable 2D-3D display [for example EP0 833 183], a second LCD is placed in front of the display to serve as a parallax optic. In a first mode, the parallax LCD is clear so that no windows are produced and an image is seen in 2D. In a second mode, the apparatus is switched so as to produce slits of a parallax barrier. Output windows are then created and the image appears to be 3D. Such a display has increased cost and complexity due to the use of two LCD elements as well as being of reduced brightness or having increased power consumption. If used in a reflective mode 3D display system, parallax barriers result in very poor brightness due to attenuation of light by the blocking regions of the parallax barrier both on the way in and out of the display.

In another type of switchable 2D-3D display [EP 0 829 744] a parallax barrier comprises a patterned array of half wave retarder elements. The pattern of retarder elements corresponds to the pattern of barrier slits and absorbing regions in a parallax barrier element. In a 3D mode of operation, a polariser is added to the display so as to analyse the slits of the patterned retarder. In this way, an absorbing parallax barrier is produced. In the 2D mode of operation, the polariser is completely removed as there is no involvement of any polarisation characteristics in the 2D mode of operation. Thus the output of the display is full resolution and full brightness. One disadvantage is that such a display uses parallax barrier technology and thus is limited to perhaps 20-30% brightness in the 3D mode of operation. Also, the display will have a viewing freedom and cross talk which is limited by the diffraction from the apertures of the barrier.

It is known to provide electrically switchable birefringent lenses for purposes of switching light directionally. It is known to use such lenses to switch a display between a 2D mode of operation and a 3D mode of operation.

For example, electrically switchable birefringent liquid crystal microlenses are described in European Optical Society Topical Meetings Digest Series: 13, 15-16 May 1997 L. G. Commander et al "Electrode designs for tuneable microlenses" pp 48-58.

In another type of switchable 2D-3D display [U.S. Pat. No. 6,069,650, WO 98/21620], switchable microlenses comprising a lenticular screen filled with liquid crystal material are used to change the optical power of a lenticular screen. [U.S. Pat. No. 6,069,650, WO 98/21620] teaches the use of an electro-optic material in a lenticular screen whose refractive index is switchable by selective application of an electric potential between a first value whereby the light output directing action of the lenticular means is provided and a second value whereby the light output directing action is removed.

A 3D display comprising a liquid crystal Fresnel lens is described in S. Suyama et al "3D Display System with Dual Frequency Liquid Crystal Varifocal Lens", SID 97 DIGEST pp 273-276.

In another type of switchable 2D-3D display, as described in PCT/GB2002/003513 a passive birefringent microlens is switched between a 2D and 3D mode by means of controlling the polarisation of light which passes through the lens and reaches an observer. It is also known from this reference to use twist in passive birefringent lenses in order to rotate the input polarisation such that the birefringent microlens geometric axis is parallel to the birefringent material axis at the lens surface.

It is known to provide polarised output from organic electroluminescent display. "Polarized Electroluminescence from an Anisotropic Nematic Network on a Non-contact Photoalignment Layer", A. E. A. Contoret, S. R. Farrar, P. O. Jackson, S. M. Khan, L. May, M. O'Neill, J. E. Nicholls, S. M. Kelly and G. J. Richards, Adv. Mater. 2000, 12, No. 13, July 5 p 971 describes a polarised electroluminescent display apparatus and demonstrates that polarisation efficiencies of 11:1 can be achieved in practical systems.

Polarisation Activated Microlenses

One prior art system which enables switching of a microlens function by controlling the polarisation of light passing through the lens is described in WO-03/015424 and is shown in plan view in FIG. 7 and incorporated herein by reference.

A backlight 102 produces illumination 104 of an LCD input polariser 106. The light passes through a thin film transistor (TFT) substrate 108 and is incident on a pixel layer 110 comprising individually controllable phase modulating pixels 112-126. The pixels are arranged in rows and columns and comprise a pixel aperture 128 and may have a separating black mask 130. The light then passes through an LCD counter substrate 132 and a lens carrier substrate 136 upon which is formed a birefringent microlens array 138. The birefringent microlens array 138 comprises an isotropic lens microstructure 140 and an aligned birefringent material with an optical axis direction 142. The output of the birefringent lens then passes through a lens substrate 144 and a polarisation modifying device 146.

Each birefringent lens of the lens array is cylindrical; the lens array 138 is a lenticular screen and the geometrical axis of the lenses is out of the page. The pitch of the lenses in this example is arranged to be substantially twice the pitch of the pixels of the display such that a two view autostereoscopic display is produced.

In a first mode of operation, the polarisation modifying device 146 is configured to transmit light with a polarisation state which is parallel to the ordinary axis of the birefringent material of the microlens array. The ordinary refractive index of the material (such as a liquid crystal material) is substantially matched to the index of the isotropic microstructure 140. Thus the lenses have no optical effect and there is substantially no change to the directional distribution of the output of the display. In this mode, an observer will see all the pixels 112-126 of the display with each eye, and a 2D image will be produced.

In a second mode of operation, the polarisation modifying device 146 is configured to transmit light with a polarisation state which is parallel to the extra-ordinary axis of the birefringent microlens array. The extraordinary refractive index of the material (such as a liquid crystal material) is different to the index of the isotropic microstructure 140. Thus the lenses have an optical effect and there is a change to the directional distribution of the output of the display. This directional distribution can be set as well known in the art so as an observer correctly positioned at the front of the display will see a left image in their left eye corresponding to light from left image pixels 112,116,120,124 and in their right eye will see a right image corresponding to right image pixels 114,118,122,126. In this way, a switchable 2D to 3D autostereoscopic display can be produced.

Lens arrays are particularly suitable for autostereoscopic displays because they combine the properties of high optical efficiency, small spot size and ability to be manufactured using well known lithographic processing techniques.

It is known to provide electrically switchable birefringent lenses for purposes of switching light directionally. It is known to use such lenses to switch a display between a 2D mode of operation and a 3D mode of operation.

FIG. 8 shows another example of the polarisation activated microlenses disclosed in WO-2004/070451. In FIG. 8, the backlight and input polarisers are not shown. The polariser 146 of FIG. 7 is replaced by an electrically controlled polarisation switch comprising additional ITO layers 158 and 158 sandwiching a liquid crystal layer 160, an output substrate 164 and an output polariser 166. An electrical signal controller 162 allows switching of the electric field between the ITO electrodes to allow the liquid crystal material 160 to switch. This allows control of the polarisation state transmitted through the output polariser 166, and thus the function of the lens, as described previously.

FIG. 9 shows a similar apparatus to that in FIG. 8, but an output polariser 154 is placed on the counter substrate 132, and the ITO electrodes and LC layer 158,160 are placed between the lens 142 and the polariser 154. Such a configuration allows switching of the lens with full image contrast and brightness.

In the known switchable display apparatuses described above, the directional distribution of the output light is switchable between two modes, typically one mode in which the directional distribution is not modified such as a 2D mode and another mode in which the light output from the display apparatus is directed into a plurality of viewing windows such as a 3D mode. However it may be desirable to have further modes in which the light output from the display apparatus is directed into a different plurality of viewing windows, for example to provide viewing windows when the display apparatus is used in two perpendicular orientations ie landscape and portrait. In practice, it is difficult to arrange a switchable display apparatus to achieve this.

In the known switchable display apparatuses described above, in the mode in which the directional distribution of the light is modified the modification occurs in one dimension only, for example by directing light into windows which extend linearly. This occurs due to the use of linear parallax elements such as cylindrical lenses. As a result the desired effect such as providing an autostereoscopic image only occurs in one orientation of the display apparatus. However, display apparatuses are often used in perpendicular orientations for example to allow the display of images both with landscape and portrait aspect ratios, so it would be desirable to provide for modification of the directional distribution of the output light in two orthogonal directions. It is difficult to arrange a switchable display apparatus to achieve this.

BRIEF SUMMARY OF THE INVENTION

According to the first aspect of the present invention, there is provided a display apparatus comprising:

a spatial light modulator;

optical elements in series with the spatial light modulator and being switchable to provide:

a first parallax element being a parallax barrier capable of directing light output from the display apparatus into a first plurality of viewing windows; and a second parallax element capable of directing light output from the display apparatus into a second plurality of viewing windows, the optical elements being switchable to operate in a first mode in which the first and second parallax elements have substantially no directional effect on the light output from the display apparatus, a second mode in which the first parallax element directs light output from the display apparatus into the first plurality of viewing windows and the second optical element has substantially no directional effect on the light output from the display apparatus and a third mode in which the first parallax element has substantially no directional effect on the light output from the display apparatus and the second optical element directs light output from the display apparatus into the second plurality of viewing windows.

Thus the display apparatus is capable of switching between modes in which the light is directed into a first or a second plurality of viewing windows. For example the viewing windows may extend orthogonally to one another to provide viewing windows when the display apparatus is used in two perpendicular orientations ie landscape and portrait.

It is generally desirable in addition to switch the directional functionality between a first non-directional mode in which the behaviour of the display apparatus is substantially the same as the base panel, and a second directional mode in which the behaviour of the display apparatus is a directional display, for example an autostereoscopic display.

Prior art directional displays such as those incorporating cylindrical lenses, arrays of elongate slits or rows of holograms produce parallax in a single direction only. This conveniently serves to reduce the loss of resolution imposed by the optical element in the directional mode. However, the display orientation of the directional mode is fixed by the direction of the optical element geometric axis, so the display can be used in one of landscape or portrait mode.

In devices such as mobile phones and cameras, it is desirable to rotate the display to suite the image, for example between portrait and landscape for a photo viewing application. Such functions cannot be enabled in a standard directional display.

Such a display apparatus exhibits resolution loss associated with either first or second directional distributions, but advantageously not with both directional distributions. Therefore, the resolution of the mode in each of the directional distribution is optimised, and the image appearance is improved.

In one advantageous type of display apparatus, the first and second parallax elements are formed separately and both arranged on the output side of the spatial light modulator without any polariser between the first and second parallax elements.

Thus, it is possible to produce a display apparatus which is in a first mode a 2D display, in a second mode a lenticular screen 3D display, for example, for landscape operation and a third mode a parallax barrier 3D mode, for example, for portrait operation. For each mode of operation, the lens and parallax barrier elements are placed between a single pair of polarisers and co-operate, based on the polarisation stated passed between the lens and parallax barrier. Advantageously it is not necessary to incorporate an additional polariser or multiple substrates between the lens and parallax barrier. This allows the apparatus to be fabricated with a reduced number of substrates, reducing weight and cost. Advantageously, this also allows the separation of the barrier from the pixel plane to be reduced, which reduces the nominal viewing distance of the display for a given window size. Advantageously, each of the modes of the embodiment may enable the use of an output polariser as the final element in the stack. Such a polariser reduces the visibility of frontal reflections from components in the display.

Advantageously, a polariser is not required to be attached, for example by means of lamination, between each of the parallax elements. This means that the elements can be fabricated as an optical stack without the need for additional surfaces on which to mount an intermediate polariser. Thus, advantageously the number of substrates can be reduced, and the elements can be processed at elevated temperature prior to attachment of the polariser elements. This allows for further cost reduction and integration of the structures. This also means that multiple elements could be made using a motherglass and divided, further reducing cost and complexity of manufacture, which would not generally be possible if an intermediate polariser layer were required.

In another advantageous type of display apparatus, the spatial light modulator has arranged in series therewith:

an input polariser;

a birefringent lens comprising a layer of isotropic material and a layer of birefringent material having a lens surface therebetween shaped to direct light output from the display apparatus into a second plurality of windows;

electrodes for applying an electric field across the layer of birefringent material and patterned to provide alternating, independently addressable slit regions and barrier regions arranged so that light passing through the slit regions is directed into a first plurality of windows;

a switchable polarisation rotation element for selectively rotating the polarisation of light passing therethrough; and an analyser polariser, the display apparatus being switchable by control of the voltage applied to the electrodes and of the switchable polarisation rotation element to operate in a first mode in which the birefringent lens has substantially no directional effect on the light output from the display apparatus, a second mode in which light is output from the apparatus through the slit regions but not the barrier regions into the first plurality of viewing windows and the lens surface has substantially no directional effect on the light output from the display apparatus and a third mode in which the lens surface directs light output from the display apparatus into the second plurality of viewing windows across the entirety of the slit regions and barrier regions.

Such a display apparatus advantageously enables the operation of a lens array in a first mode and a parallax barrier in the second mode. Parallax barriers have advantages for directional displays such as autostereoscopic displays, that they can be lithographically formed to high precision. Further, they can be used with staggered aperture functions, so as to reduce the visibility of resolution loss of displays. Thus, it is convenient for an autostereoscopic display to be configured in a first mode with a lens array and in a second mode with a barrier array. Thus, in a first mode, optimum results can be achieved by matching the pixel pattern to a lens array, while in a second mode the pixel pattern can be matched to a barrier array. This can allow the viewing distance for the two directional modes to be matched for example, as they have a defined separation.

Therefore, the appropriate optical element for the appropriate orientation can be enabled. This can be used to enable optimum performance. The barrier may preferably be used to image the pixels in the portrait mode, while the lens may preferably be used to image the pixels in the landscape mode. Thus the portrait mode parallax element should be closer to the pixels than the landscape mode device in order that the viewing distance of the display in each mode is similar. Additionally, in a landscape mode parallax barrier, the gaps between the slits of the barrier may be more visible to the human eye compared to the gap between the slits in the portrait mode. Lenses do not suffer from the same gap visibility problem, because there is a continuous intensity across the lens aperture. Therefore, it may be advantageous to set the parallax barrier to image the pixels in the portrait mode, and thus closer to the display pixel plane than the lenses.

Desirably different optical functions are achieved by positioning optical elements at different distances from the pixel plane of a display. A lens array with power in two axes (i.e. a two dimensional lens array which is not a cylindrical lens array) positioned in a single plane does not achieve this function. Surface relief lens arrays disadvantageously have a common sag between first and second axes, and so non-square lenses have substantially common focal lengths in the two axes. Therefore, a two dimensional lens array does not adequately image the pixel plane for operation in two axes. Thus it is difficult for a two dimensional lens array to demonstrate high quality in both landscape and portrait modes of autostereoscopic operation for example.

Configurations in which the parallax barrier and lenticular screen are in nominally the same plane have advantages for landscape and portrait operation in systems using RGB strip pixel patterns. In particular, the size of the optical spot at the pixel plane may be different for landscape and portrait operation. In landscape operation for a panel as shown for example in FIG. 11d, the lens may be designed to produce a tightly focussed spot, and thus high window quality. The barrier may be designed to produce a wide, but advantageously achromatic, spot which covers a red, green and blue colour sub-pixel. Thus, an autostereoscopic image may be produced, each orientation of which is optimised.

In another advantageous type of display apparatus, the spatial light modulator is a transmissive spatial light modulator, and the first parallax element is arranged on the input side of the spatial light modulator and the second parallax element is arranged on output side of the spatial light modulator.

It may be desirable to us a parallax barrier in two modes of operation in two modes, which may simplify construction. Such a configuration is particularly advantageous, as the sizes of pixels tends to be different in landscape and portrait configurations. Thus the barriers for the two configurations can be set at the corresponding separations so that the final viewing distance is nominally the same for both portrait and landscape modes. Such an apparatus makes efficient use of the light in the 2D mode, but suffers from losses in the 3D mode. Such an apparatus does not require the use of separate polarisers or substrates between each element and thus reduces device complexity and cost while optimising viewing distance of the display in each mode of operation. Alternatively, the nominal viewing distances may be set to be different to optimise the usability of the display for each panel orientation.

According to a second aspect of the present invention, there is provided a switchable display apparatus comprising:

a spatial light modulator; and a birefringent lens arranged in series with the spatial light modulator and comprising a layer of birefringent material between two opposing lens surfaces, the lens surfaces each shaped as an array of cylindrical lenses extending substantially orthogonally to each other, the display apparatus being switchable between a first mode in which the birefringent lens has substantially no optical effect on light output from the display apparatus and a second mode in which the directional distribution of the light output from the display apparatus is modified by both of the opposing lens surfaces.

Thus, the display apparatus is switchable into a mode in which the directional distribution of the light output from the display apparatus is modified by both of the opposing lens surfaces which are each shaped as an array of cylindrical lenses extending substantially orthogonally to each other. This means it is possible to provide an effect, such as directing light into a plurality of viewing windows to provide an autostereoscopic display, in two orthogonal directions. This allows the use of the display apparatus in two perpendicular orientations, for example in landscape or portrait orientations. This is achieved in a manner which is straightforward to construct and manufacture in practice because of the formation of the a birefringent lens as a layer of birefringent material between two opposing lens surfaces.

Such an apparatus does not require two switching elements, and can be conveniently manufactured. Further, the optical power of the elements on first and second surfaces can be tuned independently to match the underlying pixel structure. Thus such an apparatus can produce more effective autostereoscopic viewing windows at a lower cost compared for example using a two dimensional lens array in a single plane.

In another form of the second aspect of the present invention, there is provided a switchable multiple parallax optic display device comprising:

a first parallax element arranged in series with a second parallax element; and a linear polarisation transmitting element, where the second parallax element cooperates with the first parallax element such that:

in a first mode such that the directional distribution of output light is substantially unmodified (a non-directional mode); and in a second mode such that the directional distribution of output light is modified by the first and second parallax elements.

In the following a "non-directional mode" is used to mean a mode configured to provide substantially no directional modification of the input illumination of the parallax optic.

A display apparatus in accordance with the present invention can be used for:

an autostereoscopic display means which can conveniently provide a moving full colour 3D stereoscopic image which may be viewed by the unaided eye in a first mode of operation and a full resolution 2D image in a second mode of operation;

a switchable high brightness transmissive, transflective and reflective display system which in a first mode may exhibit substantially non-directional brightness performance and in a second mode may exhibit substantially directional brightness performance; and/or a multi-viewer display means which can conveniently provide one 2D image (which may be moving full colour) to one observer and at least a second different 2D image to at least a second observer in one mode of operation and a single full resolution 2D image seen by all observers in a second mode of operation.

Different features of the first aspect of the invention may tend to provide the following advantages singly or in any combination:

multiple modes of operation of the directional display apparatus can be arranged with independent performance;

a non-directional mode can be configured;

display has substantially the full brightness of the base display;

use of standard materials and processing techniques;

low cost;

compatible with off-the shelf flat panel displays; and high performance of display in directional modes.

Embodiments of the present invention will now be described, by way of example only, with reference to the accompanying drawings.

BRIEF DESCRIPTION OF THE DRAWINGS

In the drawings:

FIG. 10 shows an example of a switchable display with a single directional mode with vertical and horizontal directionality;

FIG. 11a shows portrait pixels on a landscape mode panel in landscape orientation;

FIG. 11b shows portrait pixels on a landscape mode panel in portrait orientation;

FIG. 11c shows portrait pixels on a portrait mode panel in portrait orientation;

FIG. 11d shows portrait pixels on a portrait mode panel in landscape orientation;

DETAILED DESCRIPTION OF THE INVENTION

Figure 1A:
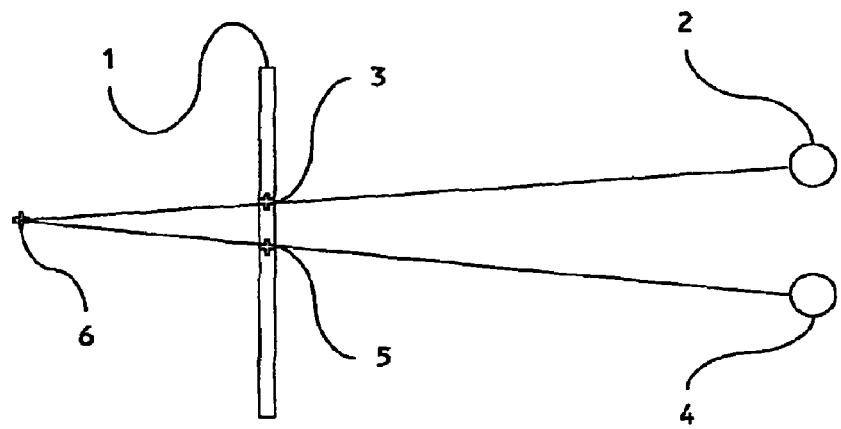
FIG. 1a shows the generation of apparent depth in a 3D display for an object behind the screen plane.
Figure 1B:
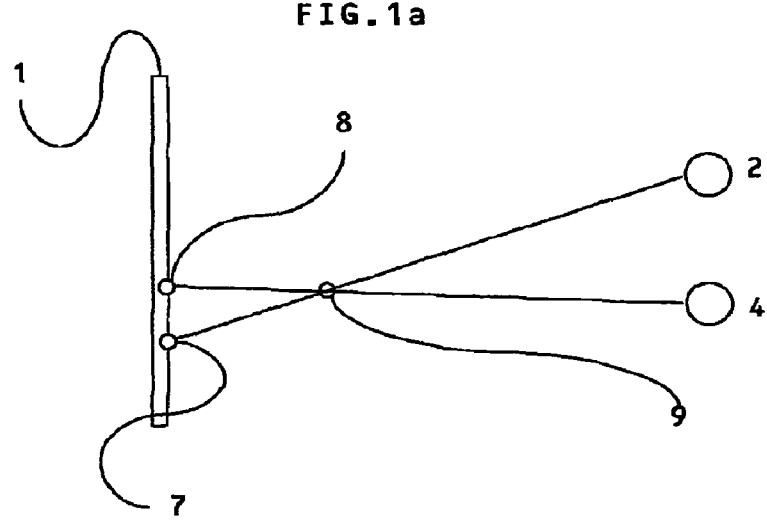
FIG. 1b shows the generation of apparent depth in a 3D display for an object in front of the screen plane.
Figure 1C:
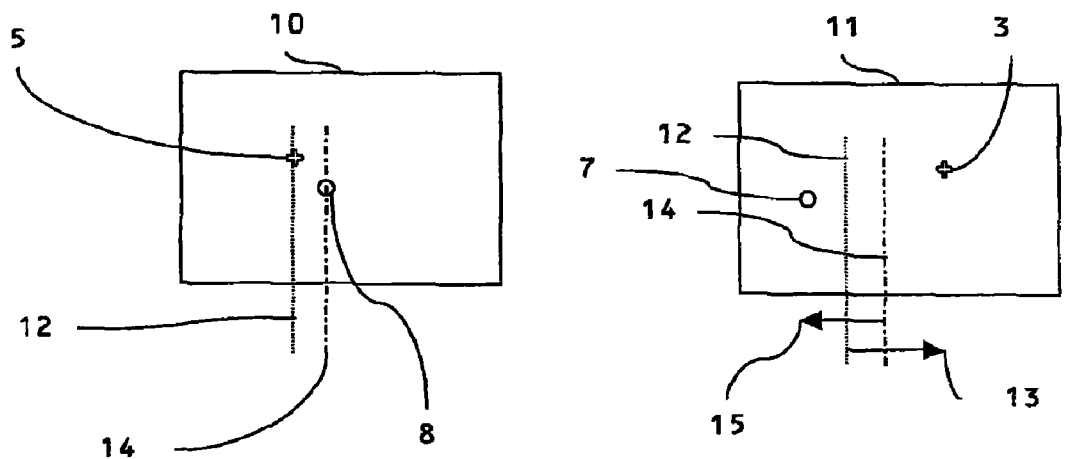
FIG. 1c shows the position of the corresponding homologous points on each image of a stereo pair of images.
Figure 2A:
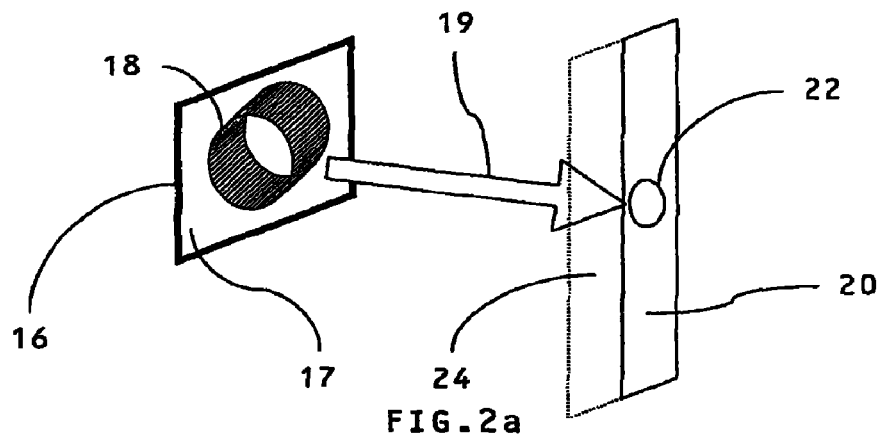
FIG. 2a shows schematically the formation of the right eye viewing window in front of an autostereoscopic 3D display.
Figure 2B:
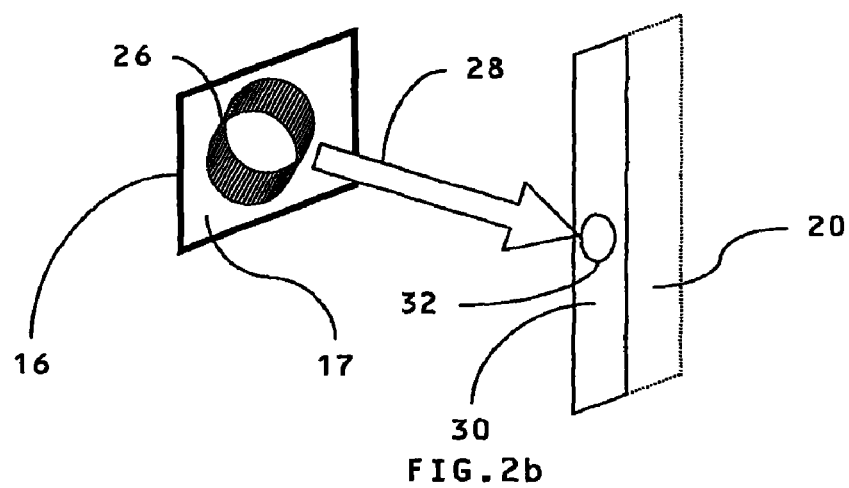
FIG. 2b shows schematically the formation of the left eye viewing window in front of an autostereoscopic 3D display.
Figure 3:
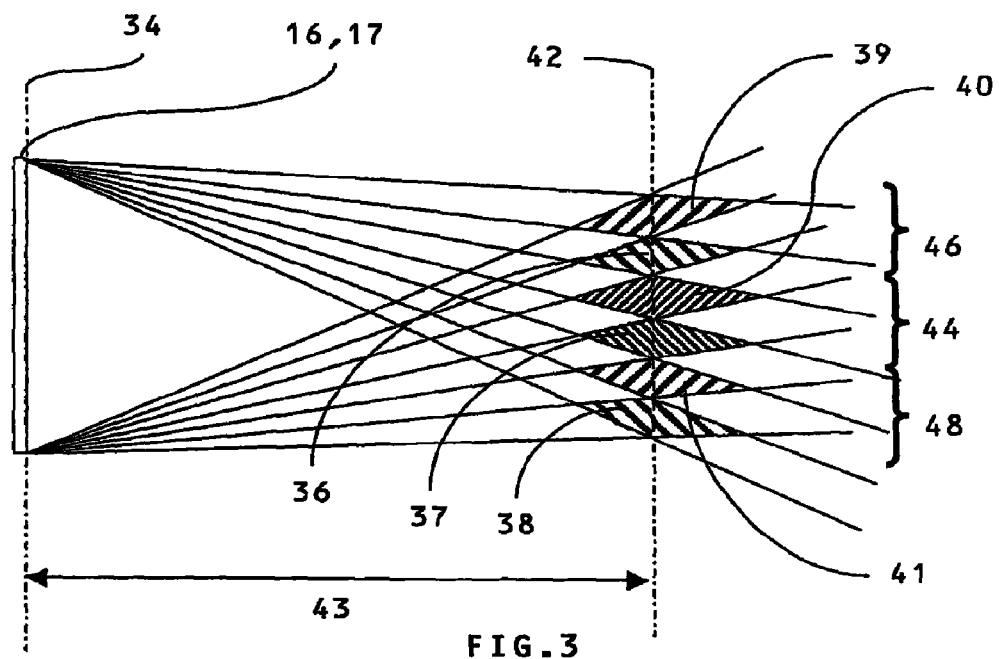
FIG. 3 shows in plan view the generation of viewing zones from the output cones of a 3D display.
Figure 4A:
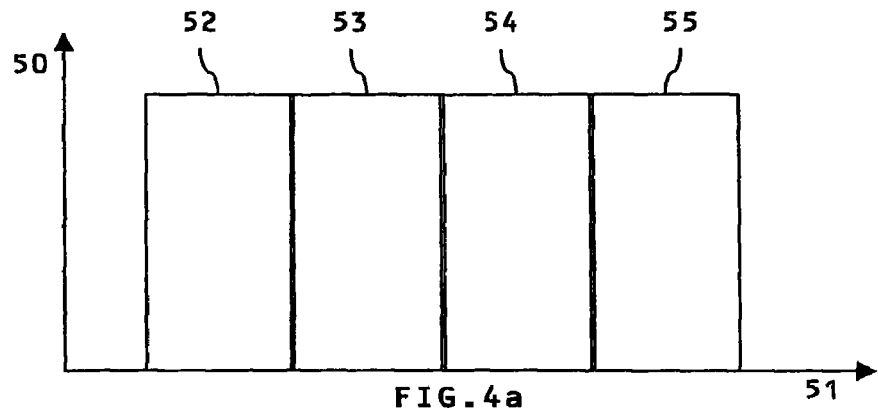
FIG. 4a shows the ideal window profile for an autostereoscopic display.
Figure 4B:
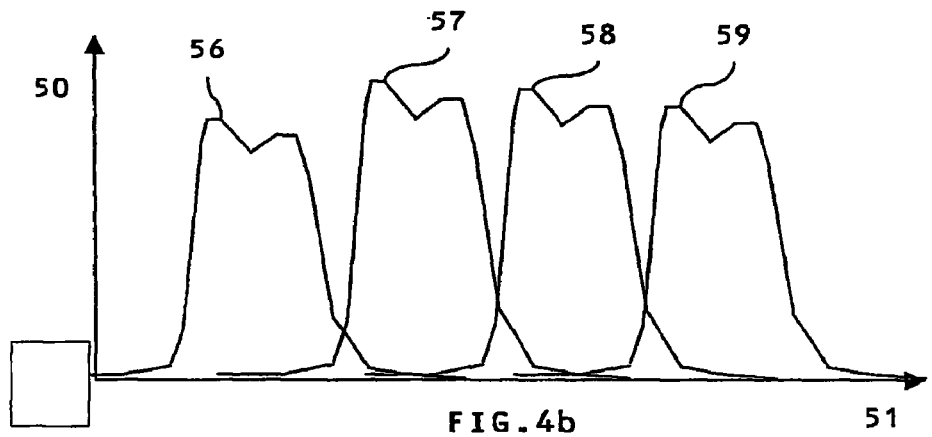
FIG. 4b shows a schematic of the output profile of viewing windows from an autostereoscopic 3D display.
Figure 5:
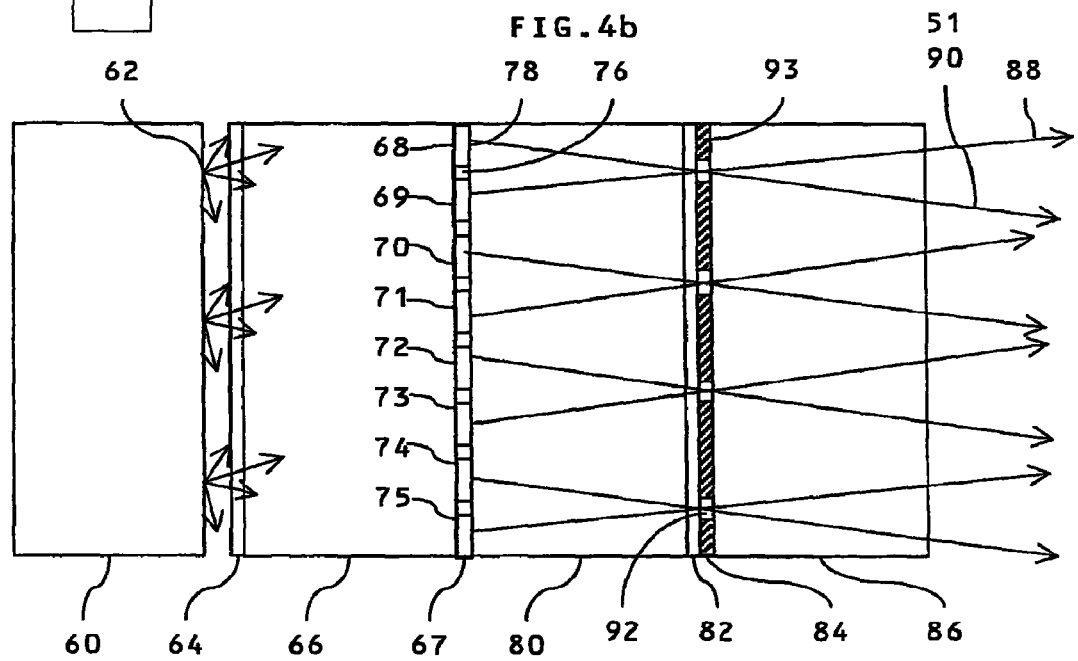
FIG. 5 shows the structure of a parallax barrier display.
Figure 6:
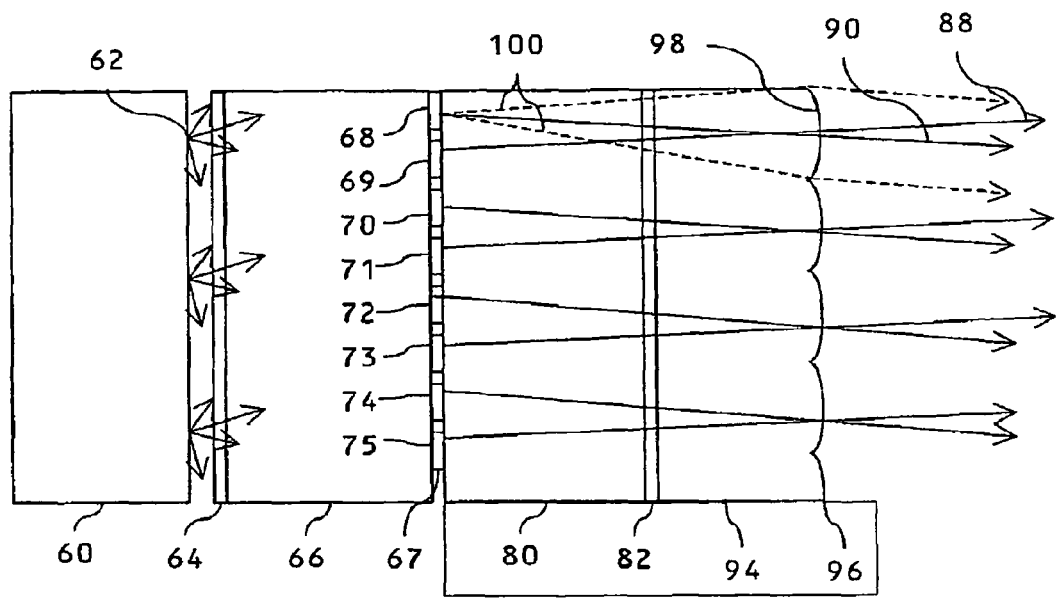
FIG. 6 shows the structure of a lenticular screen display.

Some of the various embodiments employ common elements which, for brevity, will be given common reference numerals and a description thereof will not be repeated. Furthermore the description of the elements of each embodiment applies equally to the identical elements of the other embodiments and the elements having corresponding effects, mutatis mutandis. Also, the figures illustrating the embodiments which are displays show only a portion of display, for clarity. In fact, the construction is repeated over the entire area of the display.

In this specification, the direction of the optical axis of the birefringent material (the director direction, or the extraordinary axis direction) will be referred to as the birefringent optical axis. This should not be confused with the optical axis of the lenses which is defined in the usual way by geometric optics.

A cylindrical lens describes a lens in which an edge (which has a radius of curvature and may have other aspheric components) is swept in a first linear direction. The geometric microlens axis is defined as the line along the centre of the lens in the first linear direction, i.e. parallel to the direction of sweep of the edge. In a 2D-3D type display, the geometric microlens axis is vertical, so that it is parallel or at a slight angle to the columns of pixels of the display. In a brightness enhanced display as described herein, the geometric microlens axis is horizontal so that it is parallel to the rows of the pixels of the display.

The eye spot in an autostereoscopic display is the intensity distribution produced at the pixel plane when the optical system produces an image of the observer's eye in that plane. The eye spot will move with respect to the pixels as the observer moves with respect to the display. The eye spot for cylindrical optics is generally extended vertically, whereas has a finite aspect ratio for non-cylindrical optics. The eye spot is generally round from a square or round apertured lens. The eye spot from a lens is determined by the phase function of the lens structure, and is generally determined by the aperture size and shape in a parallax barrier.

Prior art directional displays such as those incorporating cylindrical lenses, arrays of elongate slits or rows of holograms produce parallax in a single direction only. This conveniently serves to reduce the loss of resolution imposed by the optical element in the directional mode. However, the display orientation of the directional mode is fixed by the direction of the optical element geometric axis, so the display can be used in one of landscape or portrait mode.

In devices such as mobile phones and cameras, it is desirable to rotate the display to suite the image, for example between portrait and landscape for a photo viewing application. Such functions cannot be enabled in a standard directional display.

It is generally desirable in addition to switch the directional functionality between a first non-directional mode in which the behaviour of the panel is substantially the same as the base panel, and a second directional mode in which the behaviour of the panel is a directional display, for example an autostereoscopic display.

International Application No. PCT/GB04/002984 discloses use of a first and a second birefringent lens array. Such a system advantageously provides high efficiency and optical quality in a directional display with at least two modes of operation. However, it may be desirable to use other forms of birefringent parallax arrays such as a parallax barrier in at least one of the modes of operation.

Parallax barriers are optically inefficient in at least one mode of operation, for example they may typically show 30% efficiency or less in the 3D mode of operation. They may also show reduced optical quality in operation in the 3D mode compared to a lens of a lenticular screen. However, parallax barriers advantageously are substantially planar structures that can be fabricated using relatively standard liquid crystal processing technology, not requiring the fabrication of microstructures. Such elements may have reduced complexity and cost of fabrication, as well as being thinner.

It may be desirable to produce a non-directional display in a first mode of operation, a lens array optical element mode in a second mode of operation and a parallax barrier optical element in a third mode of operation.

Figure 8:
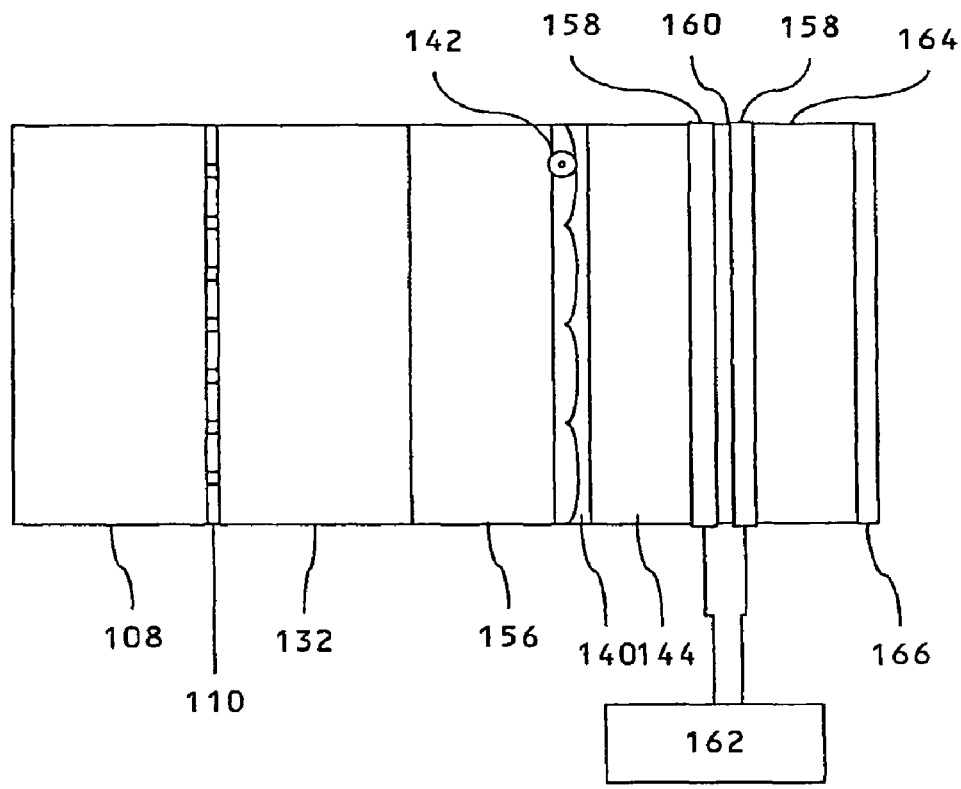
FIG. 8 shows a prior art polarisation activated microlens display.
Figure 9:
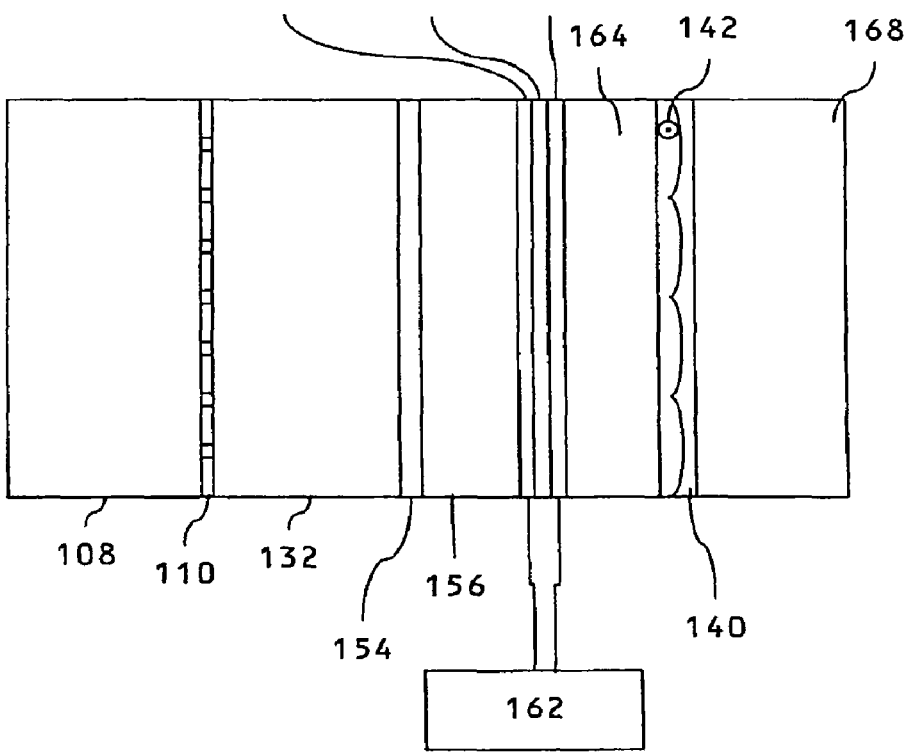
FIG. 9 shows a prior art polarisation activated microlens display.

One apparatus which can be switched between a non-directional and directional mode and can allow directional operation in both portrait and landscape orientations is illustrated in FIG. 10 for the case of a Polarisation Activated Microlens display, similar to structure and operation as that shown in FIG. 8. An LCD panel output substrate 200 has a linear output polarisation 202. The output polarisation state is incident on a lens array comprising a birefringent material (not shown) sandwiched between a counter substrate 204 with an alignment direction 206 and a surface relief lens 208 with an alignment direction 210. The output light passes through a liquid crystal shutter comprising ITO electrodes 212,214 with respective alignment directions 216,218 sandwiching a liquid crystal layer (not shown). The light then passes through a final output polariser 220 with polarisation transmission direction 222.

The lens array 208 of such a display is non-cylindrical. The lens may be arranged to have the pitch of for example substantially two columns of pixels in a first direction, and two rows of pixels in a second direction. Thus the display can in principle show an autostereoscopic display in both landscape and portrait modes of operation. The panel can be oriented in this example as a landscape panel with vertical columns of red, green, and blue pixels for example. To switch between the two modes, the left and right eye data on the panel can be in adjacent columns for landscape operation and adjacent rows for portrait operation.

Disadvantageously, a surface relief lens will have a single maximum depth which is the same for both horizontal and vertical lens axes. However, as the lens will generally be of non-square shape then the radius of curvature can be significantly different for horizontal and vertical directions. Thus, the focal length of the lens will be different in the two orientations. However, the pixel plane is a single fixed distance from the lens surface and so the apparatus can only be focussed for optimum operation in one orientation, or set at a compromise focus for both. This means that in at least one mode, the windows produced may be undesirable quality. Additionally, in the directional mode of operation, the display will provide imaging of the gaps between pixels in both vertical and horizontal axes, so that as the display is tilted about an axis, the image will appear to flicker. Additionally, the display will show limited resolution in both horizontal and vertical directions.

FIG. 11 clarifies the description of landscape and portrait panels. In FIG. 11a, a landscape panel 300 has columns of red 302, green 304 and blue 306 pixels. When rotated to portrait mode as shown in FIG. 11b, the pixel columns also rotate. FIG. 11c shows a portrait panel 308 with columns of red 310, green 312 and blue 314 pixels. FIG. 11d shows the portrait panel rotated for landscape use.

Figure 12:
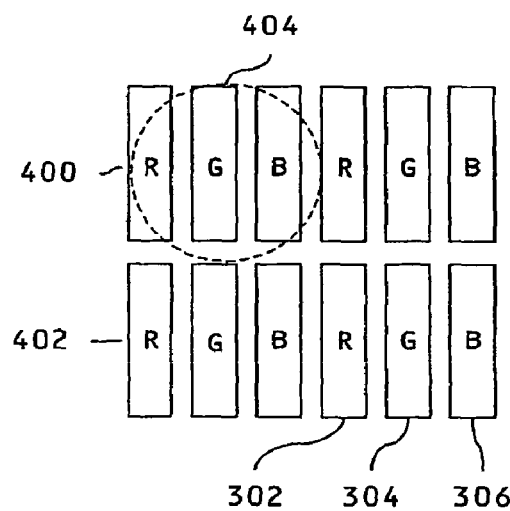
FIG. 12 shows the image of the eye spot at the pixel plane for an autostereoscopic display with square lenses.

Alternatively, the lens 208 can comprise square lenses so that the size of the optical spot at the pixel plane is the same in vertical and horizontal axes. The size of the optical spot can be set so as to cover the width of an RGB triplet of pixels as shown in FIG. 12. The pixel columns of red 302, green 304 and blue 306 pixels are arranged in rows 400, 402. In such a square lens system, the eye spot 404 is the image of the observer's eye at the pixel plane, and will thus be round as opposed to elongate, as found for cylindrical parallax elements. Thus, disadvantageously, the intensity distribution and colour of the image seen in the window plane will vary as the observer moves laterally or vertically. Such a system will have similar optical performance in both horizontal and vertical directions of operation.

Further disadvantageously, it can be difficult to maintain high performance alignment of the birefringent material at the surface of the lens array as a single alignment direction is required for the birefringent material, but the surface normals of the lens vary in two dimensions.

Thus, a non-cylindrical lens can be used to switch between a directional display which can be used in both portrait and landscape orientation for example, and non-directional display. However, such a display presents a number of disadvantages including those stated above.

In the case of a time sequential panel, in which the colour filters are omitted and the backlight is switched in synchronization with colour data, the pixels may be square profile rather than rectangular. In this case, the optical function in both directions may be the same. Such a system means that the optical components can be optimised while lying in the same plane. Therefore, such a display advantageously can produce high image quality for both landscape and portrait modes, and may be formed in a single layer, thus reducing the cost of the system.

In the following diagrams, where a symbol is used to illustrate the orientation of the birefringent material at a surface, or in or out of the plane of the page, it is to be understood that the orientation may deviate a small amount from that shown because of pre-tilt of the birefringent material at the surface, as is well known in the art.

The spatial light modulator of the invention may be a transmissive display, a reflective display, a transflective display or an emissive display (such as an organic electroluminescent display) or a combination. In the case of non-polarised displays, an additional polariser and waveplate layers may be used.

Figure 13:
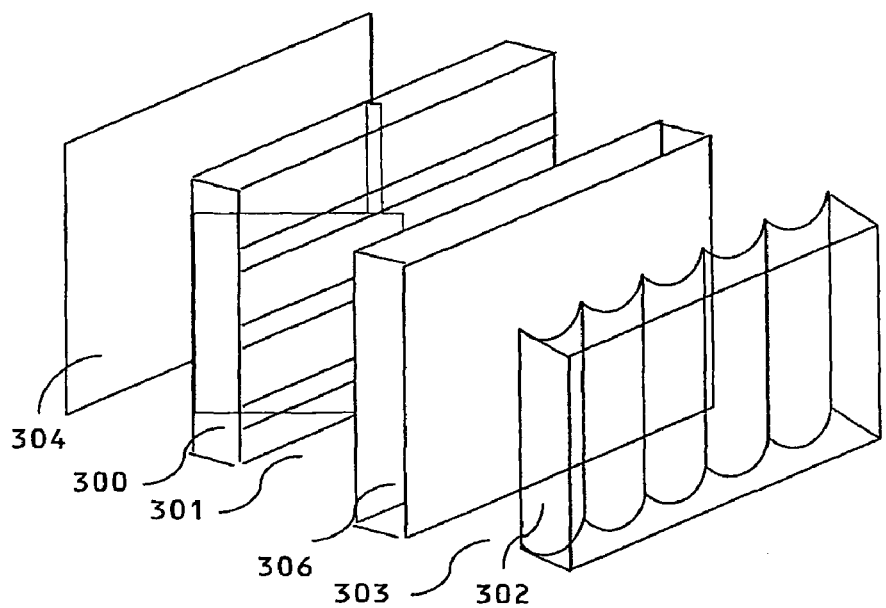
FIG. 13 shows an embodiment of the invention in which a switchable parallax barrier is configured in series with a birefringent lens element.

FIG. 13 shows one embodiment of the invention in which a switchable birefringent parallax barrier comprising a patterned electrode addressing substrate 300, alignment layers (not shown) and a switchable birefringent layer 301 is configured in series with a birefringent lens element comprising a structured polymer surface 302, alignment layers (not shown) and a birefringent layer 303, which may be switchable by means of an applied electric field for example. The elements are placed in front of a display device 304, and may be separated by a layer 306 which may comprise additional alignment layers and electrodes (not shown). Alternatively, the lens 302, 303 may be placed between the display device 304 and the birefringent barrier 300, 301.

An additional polarisation rotation element (not shown) which may be for example a liquid crystal cell may also be incorporated in series within the structure to control the polarisation of light falling on or exiting the lens component. Such a polarisation rotation element may have a function of rotating an incident linear polarisation state through 90 degrees and may be for example a twisted nematic structure, or other switchable waveplate structure.

The birefringent parallax barriers of this invention have the property that in at least one mode of operation they are capable, over at least a portion of their area, of rotating an incident linear polarisation state through an angle which may be 90 degrees. Such devices may be for example a twisted nematic structure, or other switchable waveplate structure. The polarisation rotation function may be patterned so that the regions corresponding to slits and barriers of a parallax barrier may have respectively different switching functions.

Figure 7:
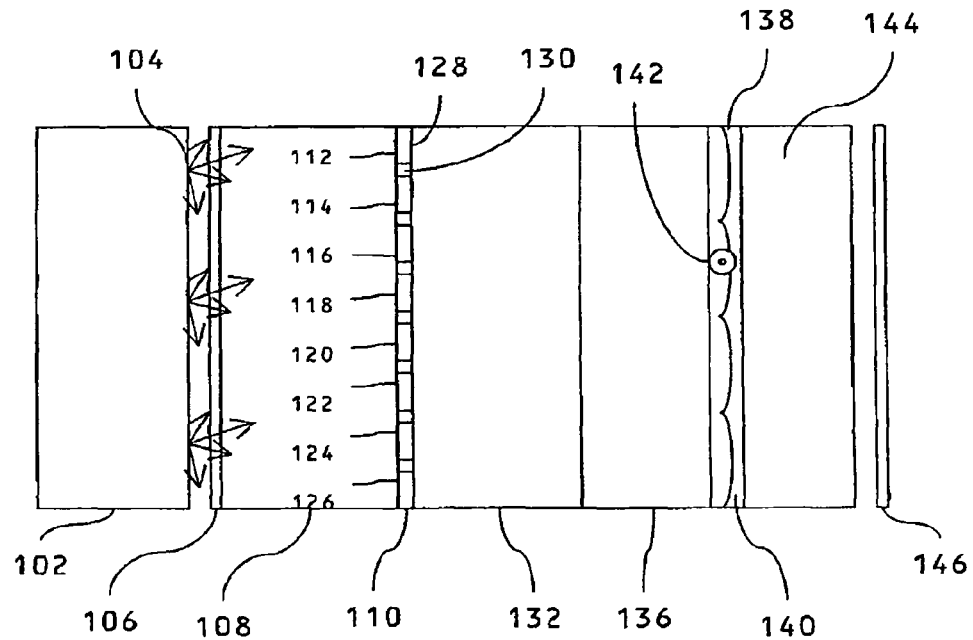
FIG. 7 shows a prior art polarisation activated microlens display.

The further embodiments described below include a backlight 102, an input polariser 106, a TFT substrate 108 and a pixel layer 110, as well in some cases as an counter substrate 132, which are the same in the prior art system described above with reference to FIG. 7. For brevity a description thereof is not repeated.

Figure 14:
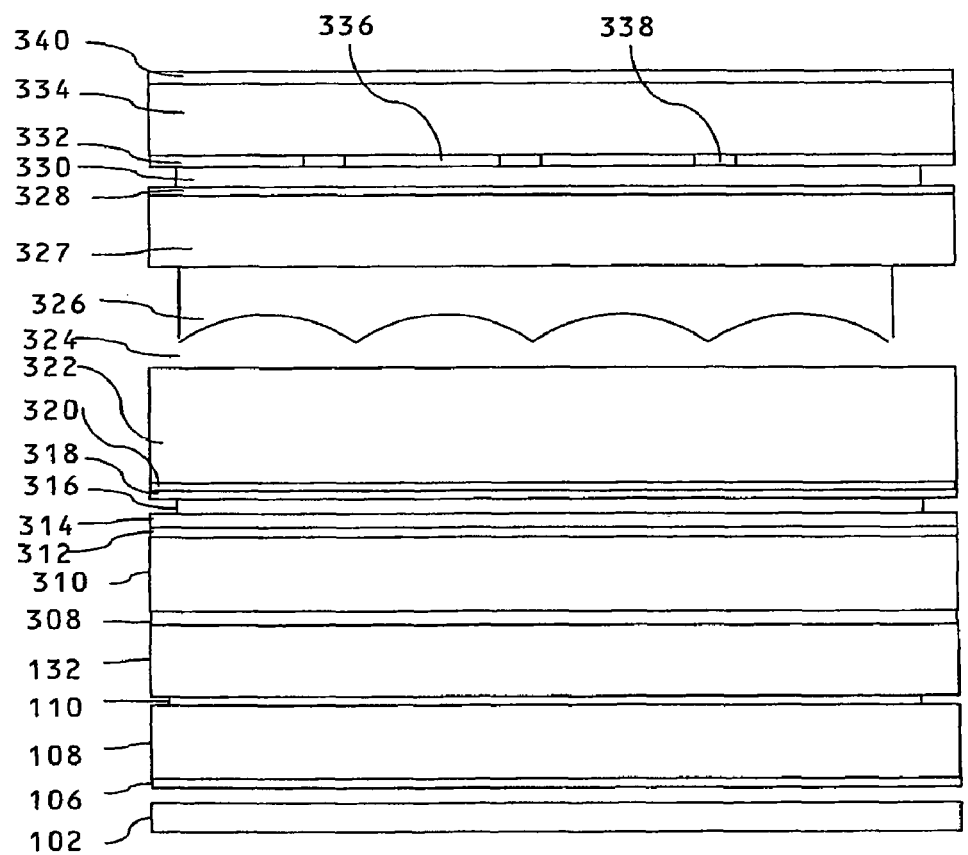
FIG. 14 shows the structure of a display apparatus comprising a switchable parallax barrier and a passive lens array.

The detailed structure of one embodiment is shown in FIG. 14 in which the structure of the barrier and lenses are shown for both elements operating with parallel geometric axes, for illustrative convenience. In practice, the elements may be set at substantially 90 degrees to each other, as described elsewhere in this application.

The display device 304 comprises the backlight 102 illuminating the display panel comprising the input polariser 106, TFT substrate 108, pixel layer 110 and counter substrate 132. The pixel layer 110 is a transmissive spatial light modulator and the following optical elements are arranged in series with, and on the output side of, the pixel layer 110.

A polariser 308 is attached to the top of the counter substrate 132.

An additional substrate 310 has a switched liquid crystal cell which acts as a polarisation control device and comprises ITO layers 312, 320, alignment layers 314, 318 and LC layer 316.

A passive birefringent lens is formed on the substrate 322, comprising alignment layers (not shown), birefringent material 324 and isotropic, microstructured polymer 326 with a microstructured interface providing a lens surface shaped as an array of lenses to direct light into a plurality of windows in the event of an index step being experienced. In operation, switching of the polarisation control device 312, 314, 316, 318 controls the polarisation of the light passing through the lens 324, 326 and hence the effect on the output light. The lens 324, 326 has substantially no effect on light of a first polarisation component but directs light of a second polarisation component into a plurality of viewing windows.

An active birefringent parallax barrier array is formed on substrates 327 and 334 comprising a uniform ITO electrode 328, alignment layers (not shown), a liquid crystal layer 330 and a patterned electrode layer 332. The patterned electrode layer 332 comprises slit regions 338 and barrier regions 336. The barrier regions 336 may comprise first electrode regions while the slit regions 338 may comprise either no electrodes whereby they are not addressable or second electrode regions whereby they are addressable independently from the barrier regions 336. The patterned electrode layer 332 is driven to control the liquid crystal layer 330 so that either light passes through both the slit regions 338 and barrier regions 336 whereby there is substantially no optical effect or else light passes only through the slit regions 338 whereby the output light is directed into a plurality of viewing windows.

A final output polariser 340 is attached to the top of the stack and acts as an analyser polariser.

As will be apparent, the barrier array 328, 330, 332 is formed on the output side of the lens 324, 326 separately but without any polariser in between.

To simplify the explanation, it is assumed that there is no twist between the alignment on the plane substrate 322 and the geometrical axis of the lens 326; in practical devices a twist may be present. The light output from the polariser 308 produces a linear output polarisation state with electric vector direction substantially parallel to the geometric axis of the lens 326.

In a first mode, no voltage is applied across the electrodes 312, 320 so that the liquid crystal layer 316 rotates this polarisation component through 90 degrees to be orthogonal to the lens geometric axis. For this polarisation state, the refractive index of the polymer of the lens 326 is matched to the ordinary refractive index of the liquid crystal material 324 so that the microstructured surface therebetween is index matched and has substantially no optical effect on the directional distribution. The output polarisation is then incident on the birefringent parallax barrier array layer 330. No voltage is applied to the barrier electrode regions 336 so that the incident polarisation is parallel to the ordinary index of the liquid crystal material at the surface adjacent layer 328. The output polarisation is rotated by 90 degrees for the barrier regions 336 and slit regions 338 and output through the polariser 340.

In this way, by operating in cooperation, neither the lens nor the barrier are activated and the display operates without modification of the directional distribution, for example in the 2D mode of operation.

In the second mode of operation, just the birefringent lens array 324, 326 is required to operate. In this mode, the LC layer 316 is activated by a voltage applied across the electrodes 312, 320 and the polarisation output from the polariser 308 is thus unrotated. The light with this polarisation is incident on the extraordinary axis of the birefringent material 324 in the lens and thus the lens function is activated and the directional distribution is modified. The output polarisation state is passed through the birefringent parallax barrier array 328, 330, 332 unrotated by both barrier regions 336 and slit regions 338, by applying a voltage to electrodes in both barrier regions 336 and slit regions 338 in the case where both the barrier regions 336 and slit regions 338 are electroded.

There may be gap between the barrier regions 336 and slit regions 338 causing a relatively small area of the LC layer 316 to be unswitched or partially switched. These areas may create residual absorption regions across the barrier. For a panel in use in the 3D mode, the lens array 324, 326 may be arranged vertically. The barrier regions 336 and slit regions 338 may be arranged horizontally so that the resultant window profile will be vertical. However the residual absorption pattern will be a small proportion of the total area so that the window intensity variation as the display is tilted around a horizontal axis will be low. The display will appear to change intensity slightly as the display is rotated about a horizontal axis. Additionally, each eye will be at nominally the same height in the window, so there will be no noticeable difference attributable to the birefringent parallax barrier array 328, 330, 332 in the image between separate eyes.

Alternatively the slit regions 338 may have no electrode region so that the slit regions 338 appear to be black and the barrier regions 336 white for this mode of operation. As the barrier regions 336 (transmitting in this case) are much larger than the slit regions 338 (absorbing in this case), the intensity variation of the windows will also be relatively small. Thus the light which has seen the lens is output through the polariser 340, but the parallax barrier array function is substantially not activated.

In the third mode of operation, the liquid crystal layer 316 is not activated so that the lens 324, 326 is index matched in this polarisation and has substantially no optical function. However, in the birefringent parallax barrier array 328, 330, 332, the slit regions 338 are unactivated (by virtue for example of having no addressing electrode) and thus rotate the input polarisation state while the barrier regions 336 are activated. In this way, the polarisation state in the barrier regions 336 is unrotated and absorbed by the output polariser 340, while the polarisation state in the slit regions 338 is rotated and passed through the polariser 340.

Thus, it is possible to produce a display which is in a first mode a 2D display, in a second mode a lenticular screen 3D display for example for landscape operation and a third mode a parallax barrier 3D mode for example for portrait operation. For each mode of operation, the lens 324, 326 and parallax barrier array 328, 330, 332 are placed between a single pair of polarisers 308 and 340, and co-operate, based on the polarisation state passed between the lens 324, 326 and parallax barrier array 328, 330, 332. Advantageously it is not necessary to incorporate an additional polariser or multiple substrates between the lens and parallax barrier. This allows the apparatus to be fabricated with a reduced number of substrates, reducing weight and cost. Advantageously, this also allows the separation of the barrier array 328, 330 from the pixel plane of the pixel layer 110 to be reduced, which reduces the nominal viewing distance of the display for a given window size.

Advantageously, each of the modes of the embodiment may enable the use of an output polariser 340 as the final element in the stack. Such a polariser reduces the visibility of frontal reflections from components in the display.

Advantageously, a polariser is not required to be attached, for example by means of lamination, between each of the parallax elements, that is the lens 324, 326 and the parallax barrier array 328, 330, 332. This means that the elements can be fabricated as an optical stack without the need for additional surfaces on which to mount an intermediate polariser. Thus, advantageously the number of substrates can be reduced, and the elements can be processed at elevated temperature prior to attachment of the polariser elements. This allows for further cost reduction and integration of the structures. This also means that multiple elements could be made using a motherglass and divided, further reducing cost and complexity of manufacture, which would not generally be possible if an intermediate polariser layer were required.

Figure 15:
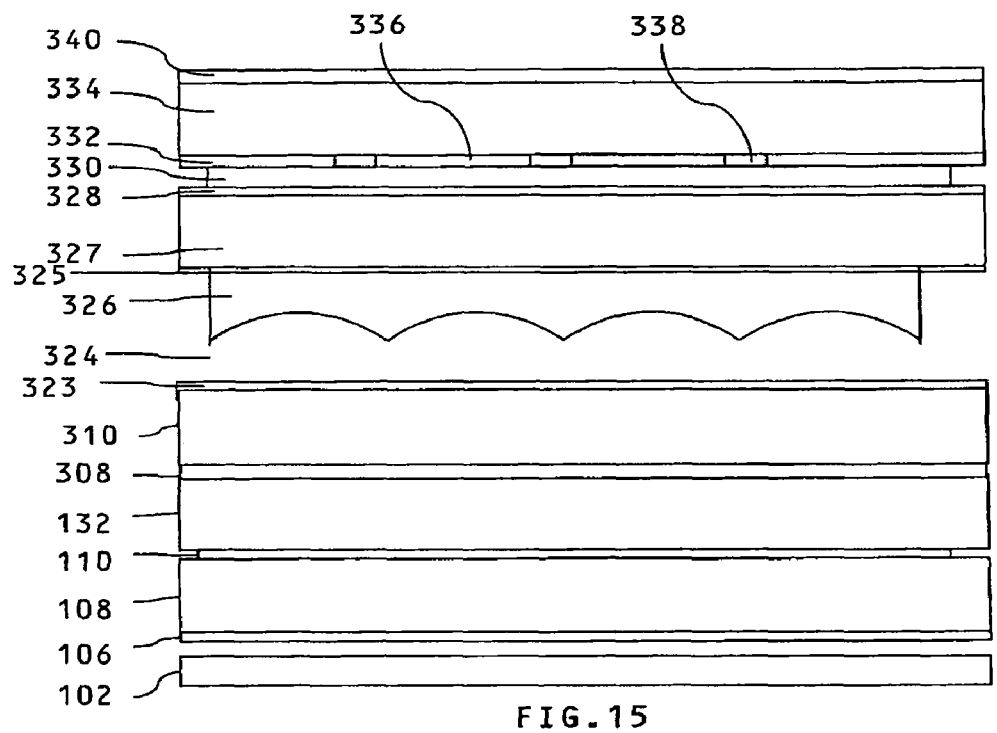
FIG. 15 shows the structure of a display apparatus comprising a switchable parallax barrier and an active lens array.

FIG. 15 shows the structure of an apparatus similar to that of FIG. 14 except that the passive birefringent lens 324, 326 and polarisation control device 312, 314, 316, 318, 320 is replaced by an active lens comprising a birefringent lens 324, 326 across which an electric field can be applied. In this case electrode layers for example as shown by 323, 325 are applied on opposite sides of the birefringent lens 324, 326 between the substrates 310 and 327. The operation of this embodiment is the same as that of FIG. 14 except that the effect of the birefringent lens 324, 326 is controlled by the control signal across the electrodes 323 and 325 rather than by control of the polarisation component of light passing therethrough.

In the first mode, the birefringent lens 324, 326 is switched by applying a voltage across the electrodes 323, 325 so that the output polarisation from the display sees the ordinary index of the birefringent material 324 in the lens which is matched to the polymer index of the polymer 326. The output polarisation is thus unrotated and sees the liquid crystal layer 330 to which no voltage is applied, so that the output polarisation state is rotated to be outputted through the polariser 340. Thus the lens and barrier have no effect on the directional distribution of the display.

In the second mode of operation, no voltage is applied to the birefringent lens 324, 326. The polarisation state from the polariser 308 sees the extraordinary index of the birefringent material 324 and so a phase step is generated at the microstructured interface with the polymer 326 and the lens function is produced. The output polarisation state from the active birefringent lens 324, 326 may be in the same direction as the output polarisation state for the first mode of operation. This output polarisation state from the birefringent lens 324, 326 is again rotated by the layer 330 for both slit and barrier regions and output towards the observer so that no parallax barrier function is produced.

In the third mode of operation, the birefringent lens 324, 326 is activated so that no phase step is seen in the birefringent lens 324, 326, but the LC layer 330 has a voltage applied in the barrier regions 336. In the slit regions 338 the polarisation in rotated and transmitted through the output polariser 340, whereas for the barrier regions 336, the polarisation is unrotated that the light passing through the barrier regions 336 is absorbed by the polariser 340.

The embodiment of FIG. 15 thus has the advantage that the structure has fewer layers and thus may be less complicated to fabricate compared to the passive lens configuration of FIG. 14. Additionally the slit regions 338 are not required to have electrodes which reduces complexity.

As in the previous embodiment of FIG. 14, the parallax barrier array 328, 330, 332 is required to operate in cooperation with the birefringent lens 324, 326. This has the same advantages of reduced cost and weight, together with reduced nominal viewing distance and reduced visibility of frontal reflections, as described above.

Figure 16:
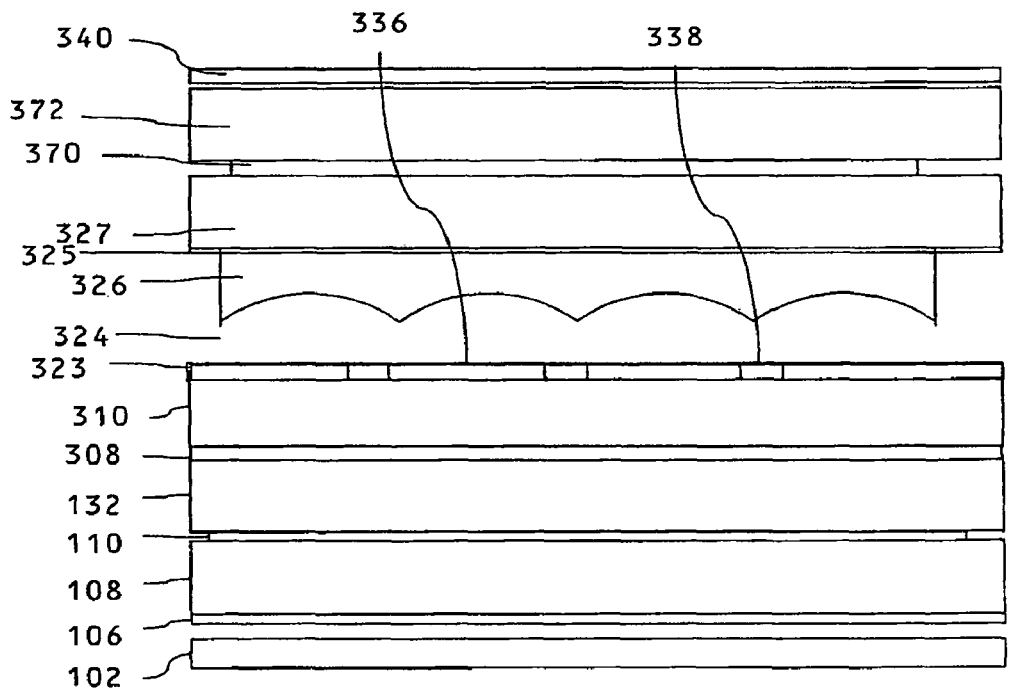
FIG. 16 shows the structure of a display apparatus comprising a switchable parallax barrier and an active lens array with a common switchable liquid crystal layer.

In further embodiments, the parallax barrier and lens may use the same liquid crystal layer so that they use common optical elements, as shown in FIG. 16. This embodiment is the same as that of FIG. 15 except that the ITO electrode 328, liquid crystal layer 330 and patterned electrode layer 332 are omitted. Instead, the electrode 323 is patterned to have barrier regions 336 and slit regions 338 which are independently addressable. The liquid crystal layer 324 is arranged to have impart a twist, for example 90 degrees to polarised light passing through the cell. Also, a uniform switch cell 370 comprising for example a liquid crystal layer with a 90 degree twist, and alignment layers (not shown) and ITO layers (not shown) is formed between substrates 327, 372.

By controlling the barrier regions 336 and slit regions 338 of the electrode 323 together, the lens 324, 346 operates as a passive birefringent lens as in the embodiment of FIG. 15. By controlling the barrier regions 336 and 338 separately, the birefringent material 324 (which is of course liquid crystal) may be operated to act as a parallax barrier.

In the first mode of operation, both barrier regions 336 and slit regions 338 are arranged to apply a voltage across the liquid crystal layer 324 so that the output polarisation from the polariser 308 is unrotated by the liquid crystal layer 324. The birefringent material 324 in the lens is arranged so that there is an index match with the polymer material 326 at the lens surface and no phase function is produced. In the first mode, the cell 370 is arranged to rotate the output polarisation from the lens and transmit through the output polariser 340, for example by applying no voltage to the cell.

In a second mode of operation, no voltage is applied across the liquid crystal material 324 in either barrier regions 336 and slit regions 338, so that the output polarisation from the polariser 308 is incident on the extraordinary index of the birefringent material 324. A voltage is applied to the cell 370 and so the output from the lens is unrotated and passes through the output polariser 340. Thus a lens function is produced.

In a third mode of operation, a voltage is applied to the slit regions 338, but not to the barrier regions 336. The light passing through the slit regions 338 thus sees no rotation of polarisation and is incident on the ordinary index of the liquid crystal material 324 at the lens surface such that the lens has no optical function. The cell 370 has no voltage applied so that the output is rotated and transmitted through the polariser 340. The light in the barrier regions 336 sees a rotation, and is incident on the extraordinary index of the liquid crystal material 324 at the lens surface. However, this polarisation state is orthogonal to the output from the slit regions 338, and so is rotated by the switch cell 370 and absorbed in the polariser 340. Thus the light from the regions of the lens which see the phase function of the lens is absorbed. Thus only the parallax barrier function is optimised.

Alternatively, patterned electrodes 323 may be applied under the polymer 326 rather than within the liquid crystal cell.

Configurations in which the parallax barrier and lenticular screen are in nominally the same plane have advantages for landscape and portrait operation in systems using RGB strip pixel patterns. In particular, the size of the optical spot at the pixel plane may be different for landscape and portrait operation. In landscape operation for a panel as shown for example in FIG. 11d, the lens may be designed to produce a tightly focussed spot, and thus high window quality. The barrier may be designed to produce a wide, but advantageously achromatic, spot which covers a red, green and blue colour subpixel. Thus, an autostereoscopic image may be produced, each orientation of which is optimised.

Figure 17:
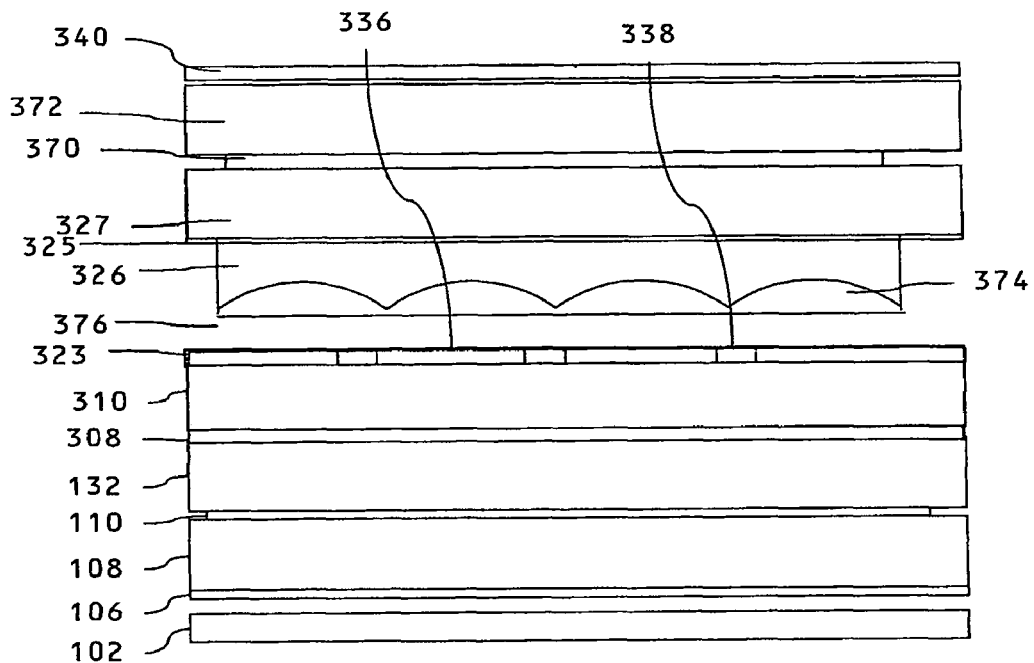
FIG. 17 shows the structure of a display apparatus comprising a switchable parallax barrier and a passive lens array.

The apparatus of FIG. 17 is configured in a similar manner to the structure of FIG. 16, but using a solid liquid crystal lens component 374 and liquid crystal layer 376 in place of the birefringent material 324. The electrode layer 325 may be formed on the substrate 327 or may be at the plane surface of the solid liquid crystal lens component 374. A thin substrate (not shown) may alternatively be placed between the layers 376, 374.

In the first mode of operation, the barrier and slit regions 336, 338 are arranged with no voltage applied so that the polarisation state from the polariser 323 is rotated through the liquid crystal layer 376 and is incident on the ordinary index of the solid liquid crystal lens component 374 which is index matched to the polymer 326. The output is then rotated by the cell 370 with no voltage applied and transmitted through the output polariser 340.

In the second mode of operation, both the barrier and slit regions 336, 338 have a voltage applied so that the polarisation state in the liquid crystal layer 376 is unrotated and incident on the extraordinary index of the solid liquid crystal lens component 374. The lens thus has a lens function. A voltage is applied to the cell 370 so that the output is transmitted through the output polariser 340.

In the third mode of operation, a voltage is applied in the barrier regions 336, so that in the slit regions 338, the polarisation state is rotated and transmitted through the liquid crystal layer 370 with no voltage applied. In the barrier regions 336, the polarisation state is unrotated and so sees the extraordinary index of the lens 374, 326 and a lens function is produced. However, this polarisation state is rotated by the layer 370 and absorbed by the polariser 340. Thus, a parallax barrier element is produced.

The embodiments of FIGS. 16 and 17 may be simplified by removing the output polarisation switching cell 370. Such a display apparatus may be configured to have a first mode in which the directional distribution of the output light is not substantially modified and a second mode in which both parallax barrier and lens produce a plurality of first and second viewing windows, respectively.

In further embodiments, the parallax barrier element may be placed between the lens and panel. Typical mobile display panels comprise red, green and blue vertical stripes of pixels, when viewed in the portrait mode. Thus the pixel width in portrait mode is approximately one third of the pixel width in the landscape mode.

The barrier may preferably be used to image the pixels in the portrait mode, while the lens may preferably be used to image the pixels in the landscape mode. Thus the portrait mode parallax element should be closer to the pixels than the landscape mode device in order that the viewing distance of the display in each mode is similar.

Figure 18:
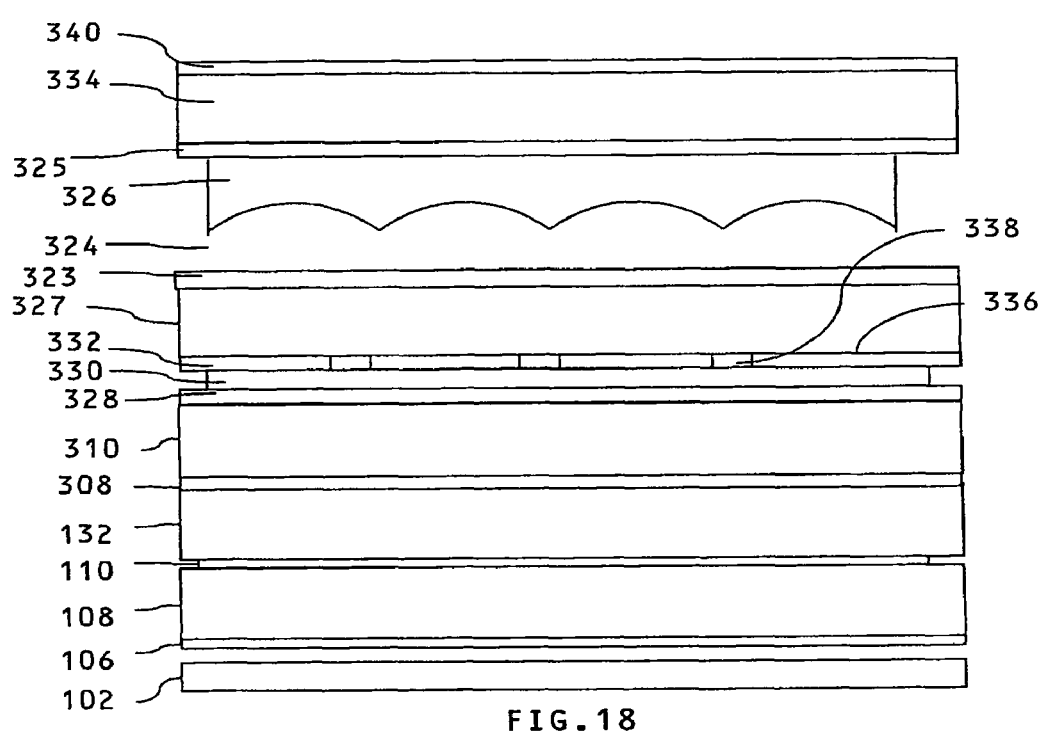
FIG. 18 shows the structure of a display in which a switchable parallax barrier is arranged between a display panel and an active lens array.

Additionally, in a landscape mode parallax barrier, the barrier regions between the slits of the barrier may be more visible to the human eye compared to the barrier region between the slits in the portrait mode. Lenses do not suffer from the same barrier region visibility problem, because there is a continuous intensity across the lens aperture. Therefore, it may be advantageous to set the parallax barrier to image the pixels in the portrait mode, and thus closer to the display pixel plane than the lenses. An apparatus which is an example of this is shown in FIG. 18, this being the same as the apparatus of FIG. 15 except that the substrate 327, the electrode 328, alignment layers (not shown), the liquid crystal layer 330 and the patterned electrode layer 332 are arranged on the substrate 310, that is between the lens 324, 326 and the pixel layer 110. The operation of the apparatus of FIG. 18 is identical to that of the apparatus of FIG. 15.

Figure 19:
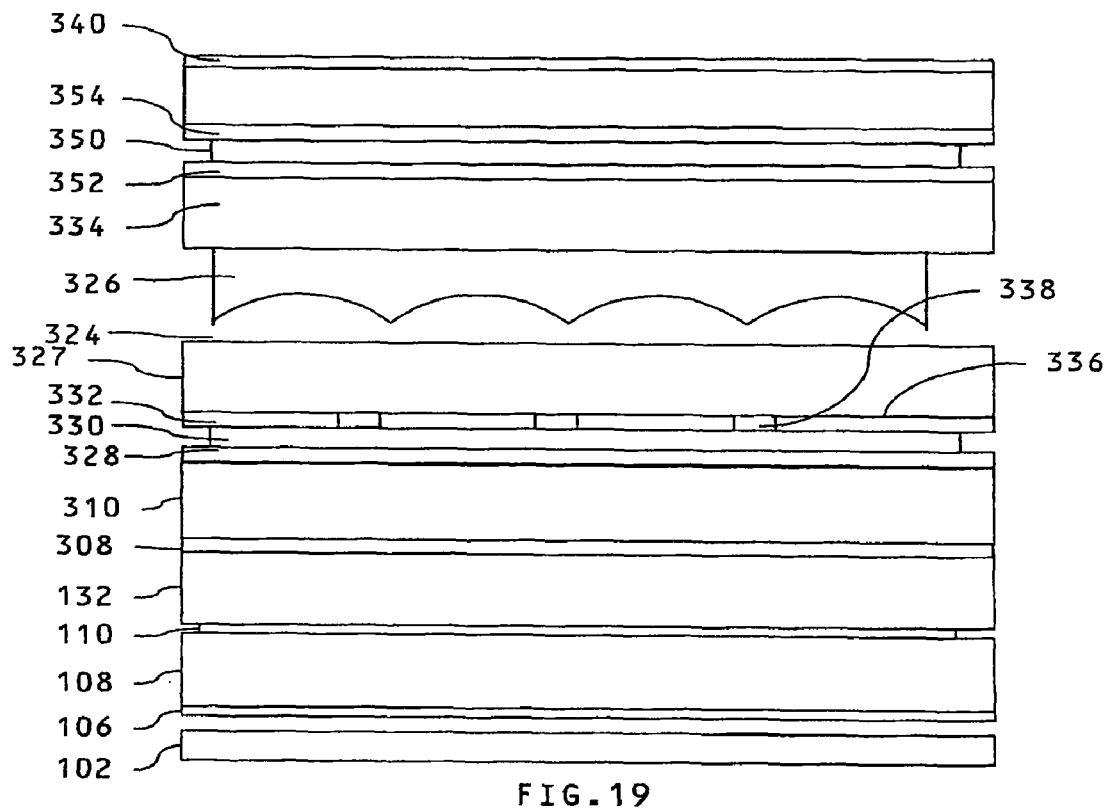
FIG. 19 shows the structure of a display in which a switchable parallax barrier is arranged between a display panel and a passive lens array.

In the apparatus shown in FIG. 19, the birefringent parallax barrier 328, 330, 332 is positioned between the lens 324, 326 and the pixel layer 110 as in the apparatus of FIG. 18. An additional uniform switching liquid crystal layer 350 with additional switching electrodes 352, 354 is positioned in series between the birefringent lens 324, 326 and the parallax barrier 328, 330, 332. The output polarisation from the polariser 308 may be at an angle to the geometric lens axis, for example 45 degrees. In this way, 50% of the incident light will be resolved on to the extraordinary axis of the lens material 324, and 50% on to the ordinary axis of the lens material 324.

In operation in a first mode, the parallax barrier layer 330 is unswitched so that the output state is rotated to −45 degrees. This is incident on to the passive birefringent lens 324, 326 and so the lens 324, 326 has an optical function for 50% of the light. The liquid crystal layer 350 is unswitched and rotates both resolved polarisation components. The final polariser transmits half of the resultant illumination, corresponding to the lens 324, 326 having no optical function.

In the second mode of operation, the layer 350 is switched so that no polarisation rotation takes place and the optical function of the lens 324, 326 is transmitted.

In the third mode of operation, the parallax barrier 328, 330, 332 is switched so that the barrier regions 336 rotate the incident polarisation state by 90 degrees while the slit regions 338 do not rotate the polarisation. Both states fall on to the lens 324, 326, and the final shutter is unswitched so that the lens 324, 326 has no optical function for the light that had passed through the slit regions 338 of the parallax barrier 328, 330, 332 and is transmitted through the final output polariser 340. The light that was transmitted through the barrier regions 336 is incident on the extraordinary axis of the lens 324, 326 and thus has a lens function. However, after passing through the final switch layer 350, this light is extinguished by the output polariser 340. Thus, only the barrier function is transmitted through the output polariser 340.

In terms of operation, the apparatus of FIG. 19 is very similar to the apparatus of FIG. 17, but the embodiment of FIG. 17 has the advantage of being thinner in that there is no substrate corresponding to the substrate 327 between the liquid crystal layer 376 and the lens component 374.

In an alternative embodiment, the switch layer 350 can be positioned between the parallax barrier 328, 330, 332 and the lens 324, 326.

In an alternative embodiment, the parallax barrier 328, 330, 332 can be configured as in FIG. 19 such that the barrier regions 336 and slit regions 338 are both comprised of separately addressable electrode regions. In the first mode, both barrier layer 330 and switch layer 350 are deactivated, and the polarisation output direction from the panel is parallel to the geometric lens axis. In the second mode, the switch layer 350 and both the barrier 336 and slit 338 electrode regions are activated. In the third mode, the barrier 336 electrodes are activated, and the slit 338 electrode and switch 350 electrodes are deactivated. In this way the display can be configured advantageously to have full brightness.

Figure 20:
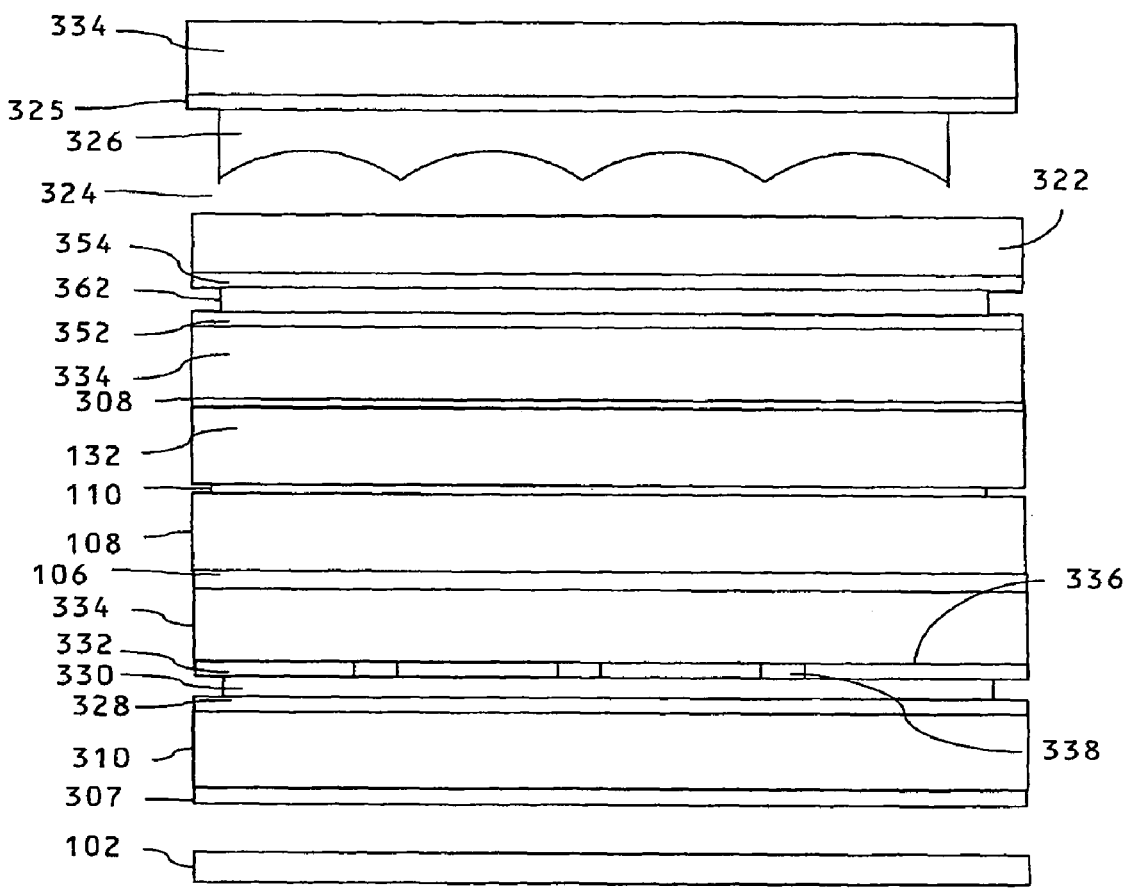
FIG. 20 shows the structure of a display apparatus comprising a rear switchable parallax barrier and a switchable front lenticular screen.

FIG. 20 shows the case of a display apparatus with a switchable parallax barrier 328, 330, 332 on the input side of the pixel layer 110 and a passive birefringent lens 324, 326 on the output side of the pixel layer 110. In particular the apparatus of FIG. 20 is the same as that of FIG. 14 except as follows.

The display panel comprises input polariser 106, pixel layer 110 between substrates 108 and 132, and output polariser 308. The birefringent parallax barrier layer comprising elements 310, 328, 330, 332, 334 is positioned on the input side of input polariser 106. The electrode 332 has barrier regions 336 and slit regions 338 having a pitch set to be slightly greater than the pitch of the barrier regions 336 and slit regions 338 in the electrode 332 of the equivalent parallax barrier 328, 330, 332 arranged on the output side of the pixel layer 110 in FIG. 14, in order to compensate for the viewing geometry of the display, as known for rear parallax barrier elements in general. An input polariser 307 is disposed on the input side of substrate 310.

A uniform switching liquid crystal layer 362 with additional switching electrodes 352, 354 is positioned between the display panel 323, 108, 110, 132, 106 and the birefringent lens 324, 326.

In operation in a first mode, the light from the backlight 102 is polarised by the input polariser 307 and is incident on the parallax barrier layer 330 which is unswitched in both barrier regions 336 and slit regions 338; so a uniform polarisation is incident on the display panel input polariser 106. The switch layer 350 is arranged to rotate light from the display panel output polariser 106 so that the lens function of the birefringent lens 324, 326 is not seen and a standard 2D display mode results.

In the second mode of operation, the layer 330 is unswitched and the layer 350 is switched so that no polarisation rotation takes place and the polarisation state from the output polariser 308 thus sees the lens function of the birefringent lens 324, 326 and light output from the apparatus is directed into a plurality of viewing windows.

In the third mode of operation, the birefringent parallax barrier electrode 332 is switched so that the incident polarisation state is rotated by 90 degrees in the barrier regions 336 while the incident polarisation state is not rotated in the slit regions 360. The switch cell 362 is arranged so that the lens function of the birefringent lens 324, 326 is not seen but the parallax barrier 328, 330, 356 directs light into a plurality of viewing windows.

Thus in this embodiment, the birefringent lens 324, 326 is passive and switching is performed by control in the switching liquid crystal layer 362 of the polarisation of the light passing through the birefringent lens 324, 326.

Figure 31:
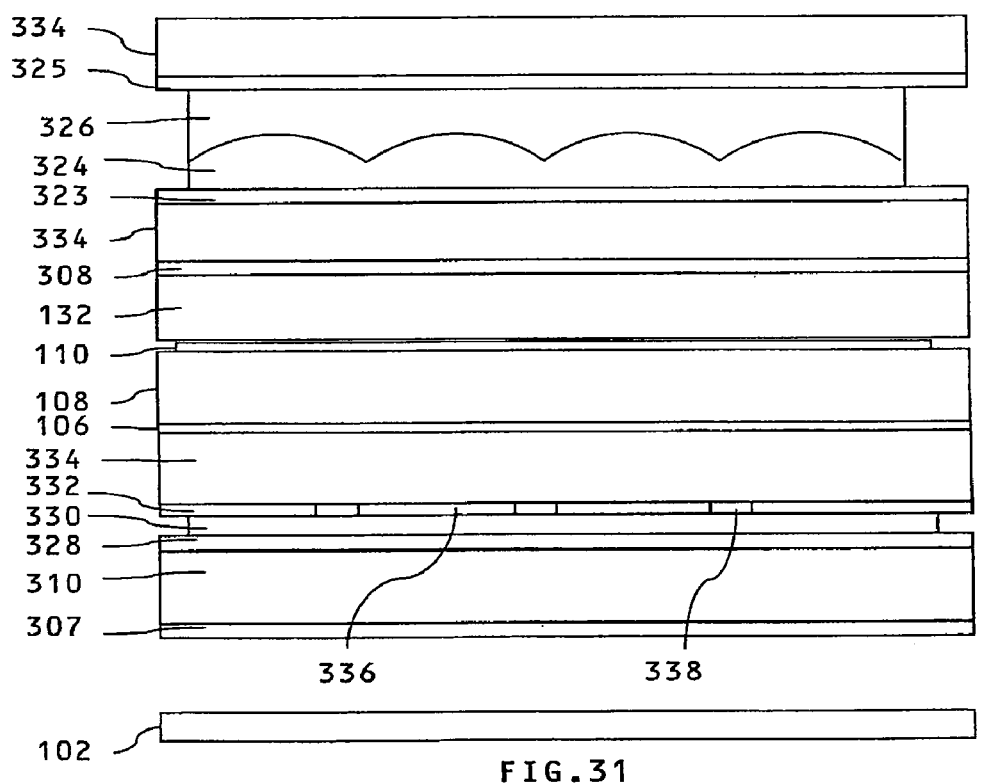
FIG. 31 shows the structure of a display apparatus comprising a rear switchable parallax barrier and a switchable front lenticular screen.

As an alternative, the birefringent lens 324, 326 could be replaced by an active birefringent lens with lens electrodes as in the embodiment of FIG. 15. An example of this is the apparatus shown in FIG. 31 which is the same as the apparatus of FIG. 20 except that the passive birefringent lens 324, 326 and polarisation control device 352, 362, 354 are replaced by an active birefringent lens 324, 326 having electrodes 323 and 325.

In one mode of operation, both the lens 324, 326 and barrier 328, 330, 332 are arranged to have no effect on the incident light. In another mode, the parallax barrier 328, 330, 332 is operated, while the lens function of the lens 324, 326 is not enabled. In another mode, the parallax barrier 328, 330, 332 has no effect while the lens 324, 326 is operated.

Such an apparatus advantageously has a short separation between the pixel plane formed by the pixel layer 110 and both the lens 324, 326 and the parallax barrier 328, 330, 332, thus reducing viewing distance. The apparatus further has high efficiency in two of the three modes.

Figure 26:
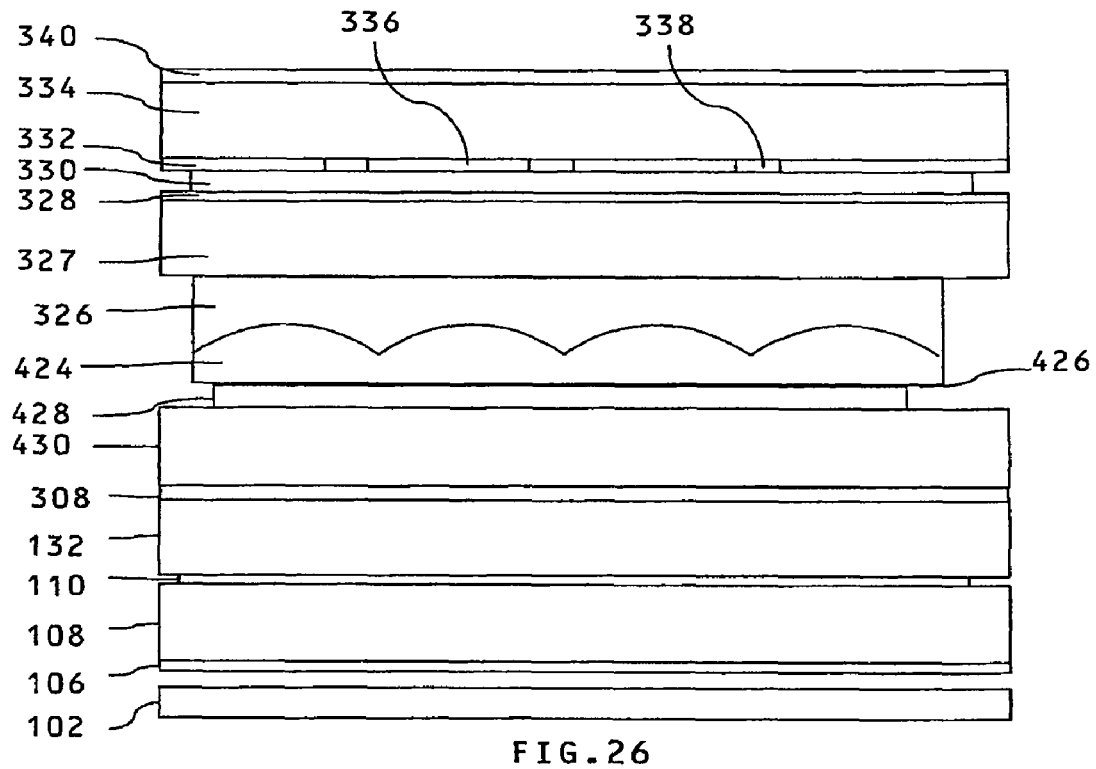
FIG. 26 shows the structure of a display apparatus using a solid birefringent lens component.

A further apparatus is shown in FIG. 26 which is the same as that of FIG. 14, except as follows. A birefringent lens is configured using a solid liquid crystal material 424 which has been formed on the surface of the polymer 326. Such a lens may be formed by means of filling a cell with appropriate alignment layers with the solid liquid crystal material 424 as a monomer while in the nematic phase, and subsequently curing the material. The plane substrate (not shown) is then removed to provide the plane surface 426 of the solid liquid crystal material 424. Such a configuration advantageously allows the removal of an additional substrate, and thus allows for a shorter viewing distance.

Instead of the polarisation control device formed by elements 312, 320 314, 316, 318, the apparatus has a polarisation control device formed by a liquid crystal layer 428 disposed between the solid liquid crystal material 424 and substrate 430. Alignment layers and ITO electrodes (not shown) are used to align and address the layer 428. Operation of the apparatus is the same as the apparatus shown in FIG. 14.

Figure 28:
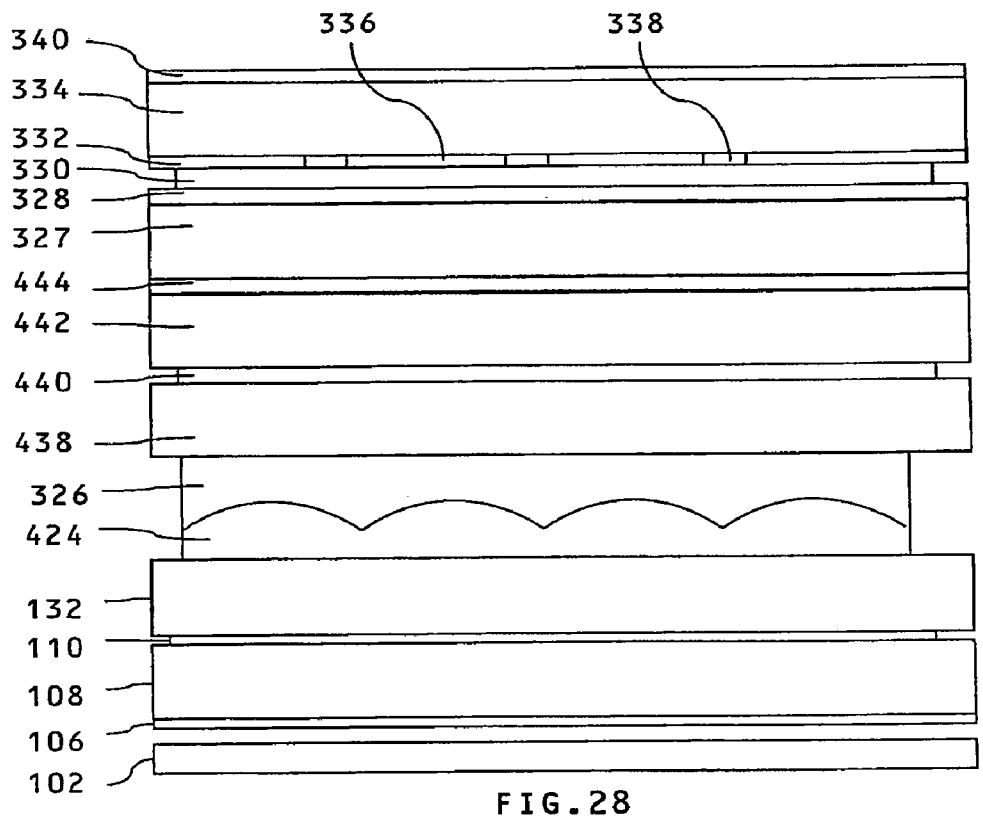
FIG. 28 shows the structure of a display incorporating a switchable passive lens component and a switchable parallax barrier component.

FIG. 28 shows a further apparatus in which a passive birefringent lens display cooperates with a parallax barrier. The apparatus of FIG. 28 is similar to that of FIG. 26, except as follows. The apparatus uses a solid birefringent lens component 424 arranged on the output surface of the display substrate 132. Advantageously, this allows a short viewing distance with high resolution image pixels.

A polarisation rotation device 440 acting as a polarisation control device is arranged on the output side of the lens 424, 326 on substrate 438. The polarisation rotation device 440 includes ITO electrodes and alignment layers (not shown). A further ITO substrate 442 with alignment layers 442 is attached. The parallax barrier 328, 330, 332 is attached to the top surface of an additional polariser 444.

In the first mode of operation, the polarisation rotation device 440 is arranged to transmit the index matched polarisation through the polariser 444. The barrier 328, 330, 332 is arranged to rotate the output polarisation for slit regions 338 and barrier regions 336.

In the second mode, the light which experiences the phase function of the lens 424, 326 is outputted through the polariser 444, and the barrier 328, 330, 332 operates in the same manner as for the first mode.

In the third mode of operation, the lens 424, 326 is arranged to be index matched as in the first mode, and the barrier 328, 330, 332 is arranged to rotate the output polarisation from polariser 444 in the slit regions 338 and not to rotate the polarisation of the light from the barrier regions 336. Thus, the light from the barrier regions 336 is absorbed in the polariser 340 and the barrier output is observed.

Figure 29:
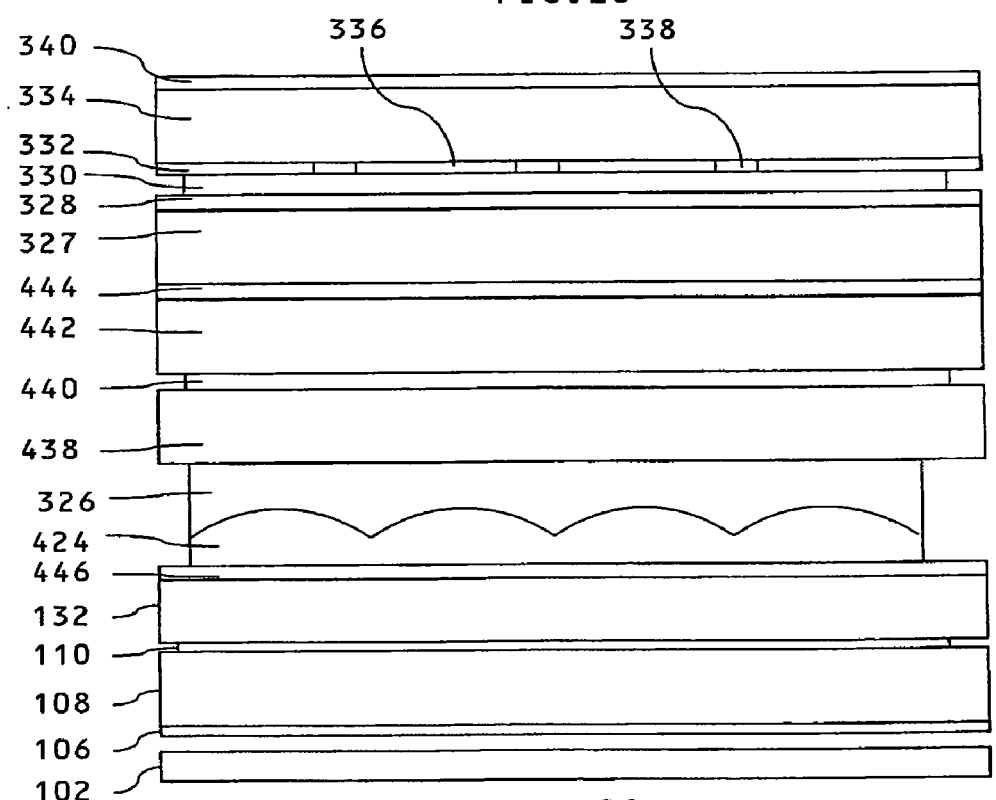
FIG. 29 shows the structure of a further display incorporating a switchable passive lens component and a switchable parallax barrier component.

FIG. 29 shows a further apparatus which is the same as that of FIG. 28 except that an additional polariser 446 is incorporated between the panel substrate 132 and the lens 424, 326. The optical axis of the lens 424, 326 is arranged to be at 45 degrees to the output polarisation of the display. Operation is similar to that of FIG. 28. Advantageously, such a display works well with high resolution panels.

In the apparatuses described above, the parallax barrier may comprise a patterned half wave retarder element in combination with a polarisation switch. Such an element has the advantage that the separation of the patterned half wave retarder from the pixel plane of the display may be minimised.

In the active lens embodiments of the present invention, addressing electrodes such as ITO or using a conductive polymer may be formed on the microstructured polymer surface, under the polymer surface or within the polymer material.

In each of the embodiments of the invention, further waveplates may be required to be inserted so as to rotate the output polarisation of the panel in the appropriate orientation with respect to the birefringent parallax optical components.

Various of the parallax barriers of the invention described so far have a slit region which is un-activated and a barrier region which can be activated. It may be possible to replace the barrier regions with a switchable polarisation twisting layer and the slit regions with a non-rotating layer. The non-rotating layer may be a birefringent material which causes no rotation of polarisation, or may be a non-birefringent material. It may be necessary to adjust the polarisation transmission directions accordingly.

Figure 21:
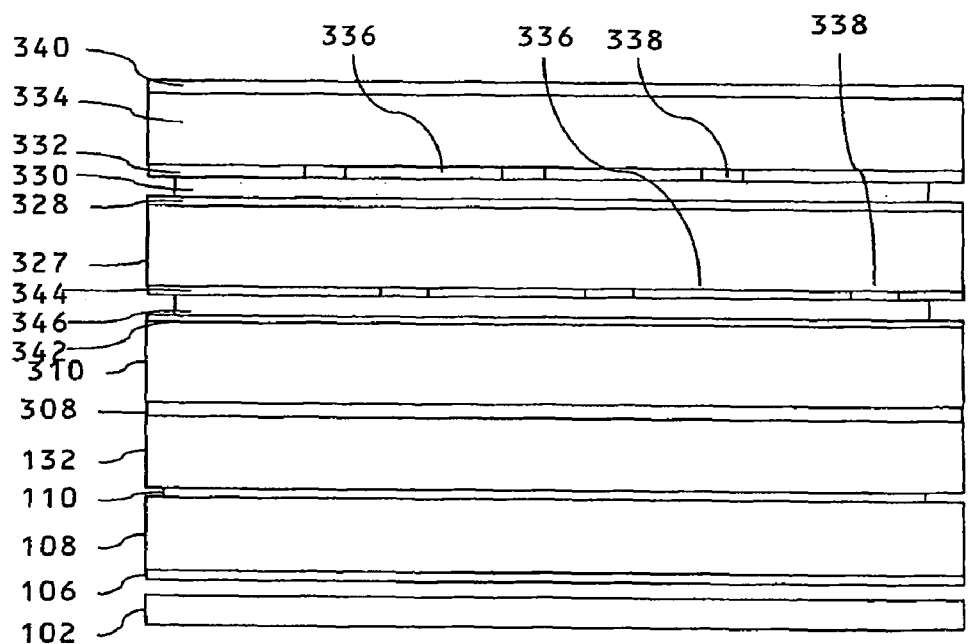
FIG. 21 shows the structure of a display apparatus comprising two switchable parallax barriers.

It may be desirable to use a parallax barrier in two modes of operation in two modes, which may simplify construction. FIG. 21 shows another display apparatus in which two parallax barriers are configured advantageously between a single pair of polarisers 308, 340 to have three modes of operation. The display apparatus is the same as that of FIG. 21 except that the birefringent lens 324, 326 and the polarisation control device 312, 314, 316, 318 is replaced by a second parallax barrier comprising electrodes 342, 344 disposed on opposite sides of a liquid crystal layer 346. Thus the second parallax barrier 342, 344, 346 is placed between the first barrier 328, 330, 332 and the pixel layer 110.

Both the first barrier 328, 330, 332 and the second parallax barrier 342, 344, 346 have patterned electrodes with switchable barrier regions 336 and non-switchable slit regions 338.

In the first mode of operation slit regions 338 and barrier regions 336 of both the first barrier 328, 330, 332 and the second parallax barrier 342, 344, 346 are set to rotate the polarisation state through 90 degrees so that a uniform illumination is passed through the output polariser 340.

In the second mode of operation the electrode 344 is set so that the polarisation state in the liquid crystal layer 346 is rotated in the barrier regions 336 and unrotated in the slit regions 336. No voltage is applied to the liquid crystal layer 330 so that the output polarisation state corresponding to the barrier layer 346 is absorbed or transmitted depending on whether the light passes through the slit regions 338 or the barrier regions 336 respectively. Thus the barrier regions 336 of the first barrier 328, 330, 332 are resolved and the first barrier 328, 330, 332 directs light into a plurality of viewing windows.

Similarly in a third mode of operation, for the second parallax barrier 342, 344, 346, the layer 330 is addressed while the layer 346 is uniform, so that the second parallax barrier 342, 344, 346 directs light into a plurality of viewing windows.

Such a configuration is particularly advantageous, as the sizes of pixels tends to be different in landscape and portrait configurations. Thus the first barrier 328, 330, 332 and the second parallax barrier 342, 344, 346 for the two configurations can be set at the corresponding separations so that the final viewing distance is nominally the same for both portrait and landscape modes. Such an apparatus makes efficient use of the light in the 2D mode, but suffers from losses in the 3D mode. Such an apparatus does not require the use of separate polarisers or substrates between each element and thus reduces complexity and cost while optimising viewing distance of the display in each mode of operation.

Alternatively, the nominal viewing distances may be set to be different to optimise the usability of the display for each panel orientation.

In various of the configurations of the display apparatuses there is a further mode of operation which give both vertical and horizontal parallax with respect to the image by allowing both apparatuses to operate at the same time. However, for a parallax barrier display, this would produce a low optical efficiency.

Figure 30:
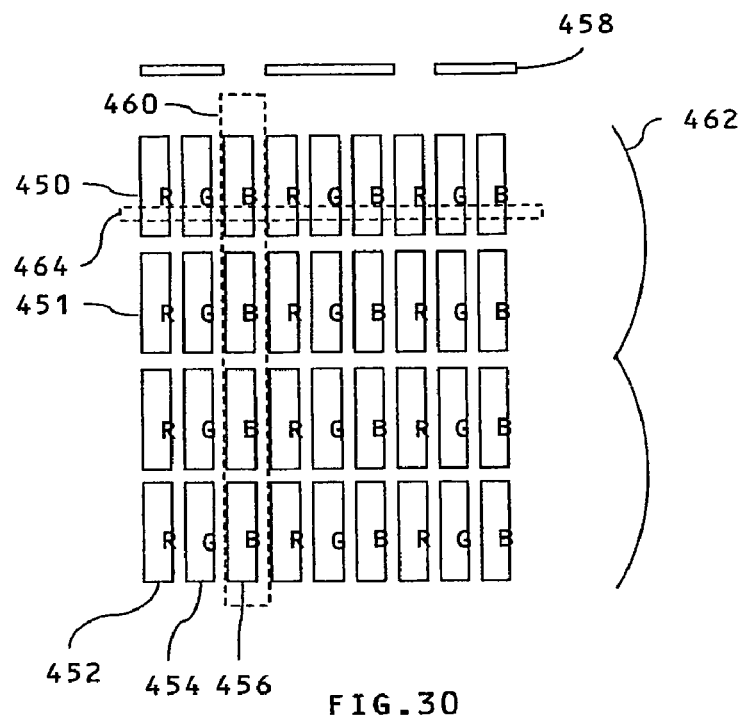
FIG. 30 shows one alignment of parallax optical elements and eye spots with respect to the image pixels.

As shown in FIG. 30, the colour sub-pixel columns 452, 454, 456 may be arranged in the portrait mode for example so that four columns of pixel apertures are placed in alignment with each optical element of the parallax array 458. Each element of the parallax array 458 may be configured so as to provide an eye spot 460 which is substantially the same as the pitch of the pixel columns at the pixel plane. The window size may be set to be substantially half of the nominal interocular separation for example by adjusting the pitch of the parallax elements. Such a configuration advantageously provides a shorter viewing distance for a fixed substrate glass thickness. Further, such an element serves to reduce the visibility of the image of the black mask in the window plane. Advantageously, the parallax element in this orientation may be a parallax barrier, such that the chromatic aberrations of the display and viewing angle are optimised in this mode of operation.

Such a configuration may for example use a lens 462 with two rows 450, 451 of pixels under each lens in the landscape orientation in which the eye spot 464 is small so as to optimise the viewing freedom of the display, and a parallax barrier in the portrait orientation with four columns of pixels aligned with each slit of the parallax barrier. To set the viewing distance to be the same in each orientation, the optical elements 458, 462 may be arranged at different respective distances from the pixel plane, in this case, the lenses being 50% further away from the pixel plane than the barriers. Alternatively, the colour sub-pixels repeat pitch may be changed from 1:3 to 1:2, so that the width of 4 colour sub-pixels may be the same as the width of 2 pixels. Such a configuration advantageously allows both parallax elements to be nominally in the same plane while providing the same viewing distance, thus reducing cost and complexity while optimising image quality in both modes of operation.

In all of the above embodiments, the images on the panel may be adjusted to suit the mode of operation of the panel. For example, in the landscape mode of operation, the pixel columns on the panel are arranged to display alternate columns of left and right eye data. In the portrait mode of operation, the pixel rows are arranged to display alternate rows of left and right eye data.

In a further aspect of the present invention, a directional autostereoscopic display apparatus is configured to have a first non-directional mode and a second directional mode with combined landscape and portrait operation, in which the landscape and portrait optical elements are formed with a common birefringent material. The optical elements may be lenses. The lenses may be cylindrical lenses.

Figure 22:
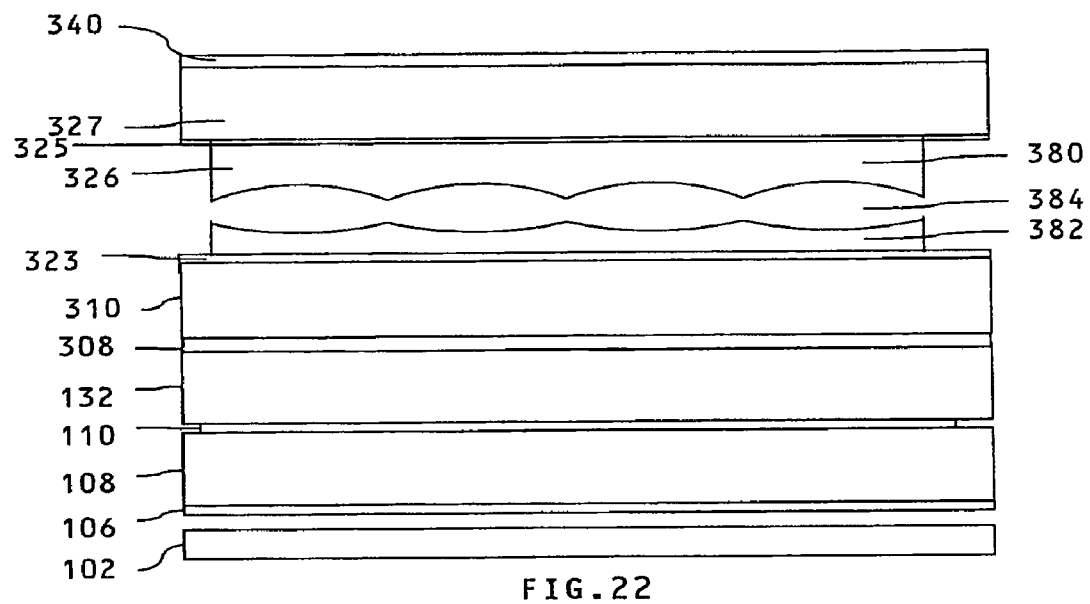
FIG. 22 shows the structure of a display comprising a switchable active lens switchable between first and second directionality.

Such a display apparatus is shown in FIG. 22 and is the same as the apparatus shown in FIG. 14 except that the elements disposed on the additional substrate 310 are replaced by the following elements.

Disposed on the additional substrate 310 is a birefringent lens array comprising a pair of lens structures 380, 382 each formed as a layer of isotropic, polymer material and a common birefringent material 384 disposed between the lens structures 380, 382. The surfaces of lens structures 380, 382 interfacing with the birefringent material 384 are each shaped as lens surfaces providing an array of cylindrical lenses. The lens structure 382 is optimised for landscape operation and the lens structure 384 is optimised for portrait operation. Thus the cylindrical lenses of both the lens structures 382 and 384 extend substantially orthogonally to one another (although for clarity they are shown as being parallel in FIG. 22). The cylindrical lenses of both the lens structures 382 and 384 are shaped to direct light into a plurality of viewing windows. The viewing windows may be arranged to provide an autostereoscopic 3D effect.

Both lens structures 380 and 382 have a refractive index equal to the ordinary refractive index of the birefringent material 384 (or in an alternative embodiment the extraordinary refractive index of the birefringent material 384).

Electrodes 323 and 325 are disposed on opposite sides of the lens structure 380 and lens structure 382 so that the birefringent material 384 may be switched by applying an electric field across the electrodes 323 and 325. Thus the birefringent lens array 380, 382, 384 is active.

A final output polariser 340 is attached to the top of the stack and acts as an analyser polariser.

In a first mode of operation, the birefringent material 384 is switched so that the light passing therethrough of the polarisation component output by the output polariser 340 experiences the ordinary refractive index of the birefringent material 384 (or in the alternative embodiment the extraordinary refractive index of the birefringent material 384). This light experiences no index step at the lens surfaces of the lens structures 382 and 384 so in this mode the light output from the display apparatus experiences substantially no directional effect from the birefringent lens array 380, 382, 384.

In a second mode of operation, the birefringent material 384 is switched so that the light passing therethrough of the polarisation component output by the output polariser 340 experiences the extraordinary refractive index of the birefringent material 384 (or in the alternative embodiment the ordinary refractive index of the birefringent material 384). This light experiences an index step at the lens surfaces of the lens structures 382 and 384 so in this mode the light output from the display apparatus experiences a directional effect from both the opposing lens surfaces of the birefringent lens array 380, 382, 384.

Advantageously, at least one of the lens structures 380 and 382 may itself incorporate a conductive element, or be a conductive polymer, in which case the electric field is not dropped across the polymer layer.

Figure 23:
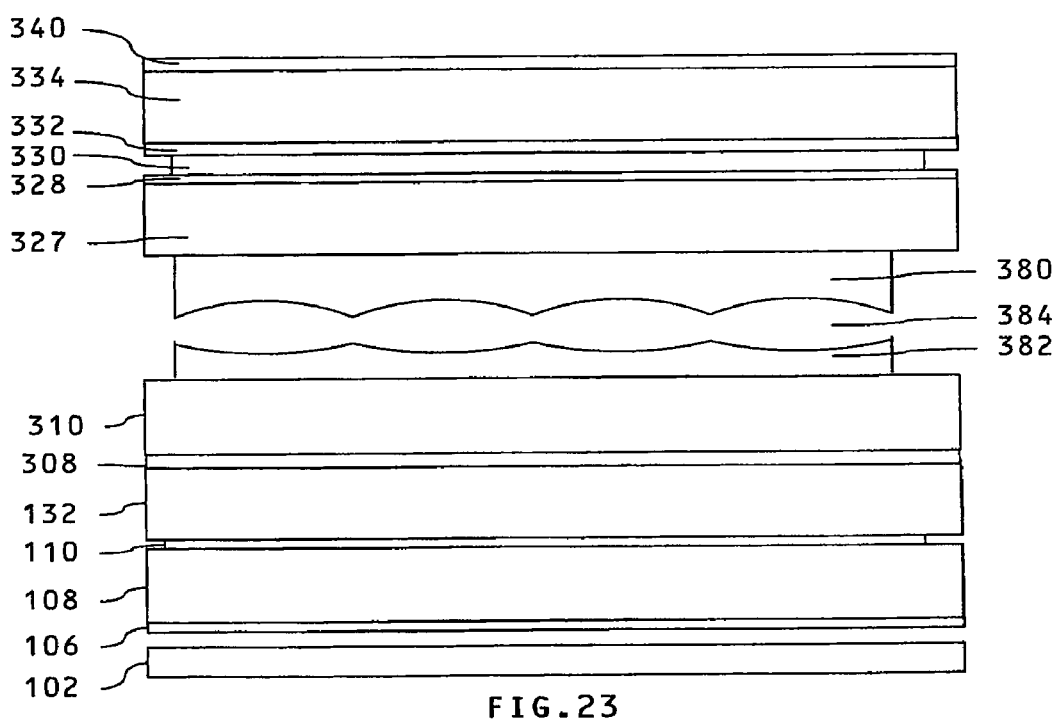
FIG. 23 shows the structure of a display comprising a passive lens array switchable between first and second directionality.

In the apparatus shown in FIG. 23, the birefringent lens 380, 382, 384 is passive instead of active. This apparatus is the same as that of FIG. 22 except that the electrodes 323 and 325 are omitted and instead a polarisation switch is formed by a liquid crystal layer 330 disposed between electrodes 328 and 332 and is used to control the polarisation state that passes through the liquid crystal layer 330 and to the user through the analyser polariser 340.

In a first mode of operation, the polarisation switch 328, 330, 332 is switched so that the light output by the output polariser 340 is the polarisation component which experiences the ordinary refractive index of the birefringent material 384 (or in the alternative embodiment the extraordinary refractive index of the birefringent material 384). This light experiences no index step at the lens surfaces of the lens structures 382 and 384 so in this mode the light output from the display apparatus experiences substantially no directional effect from the birefringent lens array 380, 382, 384.

In a second mode of operation, the polarisation switch 328, 330, 332 is switched so that the light output by the output polariser 340 is the polarisation component which experiences the extraordinary refractive index of the birefringent material 384 (or in the alternative embodiment the ordinary refractive index of the birefringent material 384). This light experiences an index step at the lens surfaces of the lens structures 382 and 384 so in this mode the light output from the display apparatus experiences a directional effect from both the opposing lens surfaces of the birefringent lens array 380, 382, 384.

Figure 27:
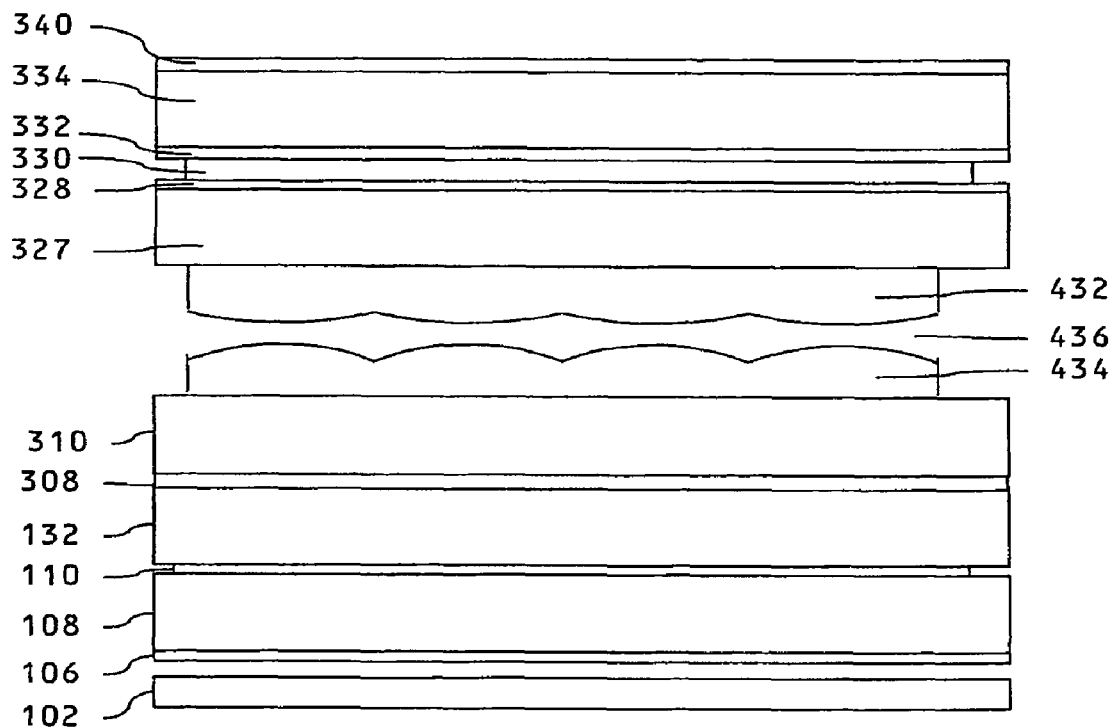
FIG. 27 shows the structure of a display in which two solid birefringent lens components are used.

FIG. 27 shows a further apparatus which is the same as that of FIG. 23 except modified so that solid liquid crystal lenses 432, 434 are formed on the respective substrates 310 and 327, and attached by an intermediate polymer layer 436. Thus, the optical function of the devices is preserved, but the fabrication process is modified. Such a structure may advantageously reduce the assembly cost of the apparatus.

In each of the apparatuses of FIGS. 22, 23 and 27, the lenses are shown for purposes of illustration as being aligned in the same axis, but in fact their geometric lens axes are rotated by 90 degrees with respect to each other. Each lens may be rubbed advantageously parallel to the lens axis, so that there is a 90 degree twist in the material 384 between the two lenses. Thus, the polarisation component from the output polariser 308 which sees the lens surface of the lens structure 382 also sees the lens surface of the other lens structure 384, and the polarisation component from the output polariser 308 that is index matched sees substantially no lens function.

The passive lens configuration of FIG. 23 has the particular advantage, that the performance of the birefringent lens 380, 382, 384 is not determined by the thickness of the lens structures 380, 382. The voltage in an active lens configuration of FIG. 22 is further increased, because in certain regions, the birefringent lens 380, 382, 384 will have up to twice the thickness of a single lens, and so the relaxation time of the birefringent lens 380, 382, 384 is significantly increased. This means that the lens will switch only slowly between 2D and 3D modes in particular. Also, a very high voltage is required to provide operation in the display of FIG. 22, and the performance of the passive lens configuration will be improved with respect to an active lens configuration.

In each cases, the radius of the cylindrical lenses may advantageously be different so that in the landscape mode for example, a tightly focussed eye spot is used whereas in the portrait mode, a wide spot may be used which covers three columns of colour sub-pixels.

In a further aspect of the present invention, alignment features are incorporated into the optical structures so as to provide precise relative alignment to the two features, without the need to provide high precision measurement for each optical structure on a panel by panel basis.

Such a configuration requires high precision alignment between the two lens structures, in addition to alignment in vertical and horizontal directions when the combined structure is aligned on the panel. This can be achieved by incorporating registration features at the edge of each lens structure 380 and 382 as shown schematically in FIG. 24. Alignment features 410, 412 may be incorporated in to the polymer structures 380, 382, such that the lenses mate at the correct angle with respect to each other. This is shown further in plan view in FIG. 25 for the first substrate 327 with lens geometric optical axis 416 and alignment features 414 which mate to alignment features 420 on the second substrate 310 with lens geometric optical axis 418. The alignment features may run vertically on one side and horizontally on the other, for example features 420 may be vertically extending, while features 422 may be horizontally extending on both substrates.

During assembly of the optical component, the two components are brought close to each other and mated using the alignment features. Thus, a high accuracy alignment tool is not required to set the relative angle between the two surfaces.

Figure 24:
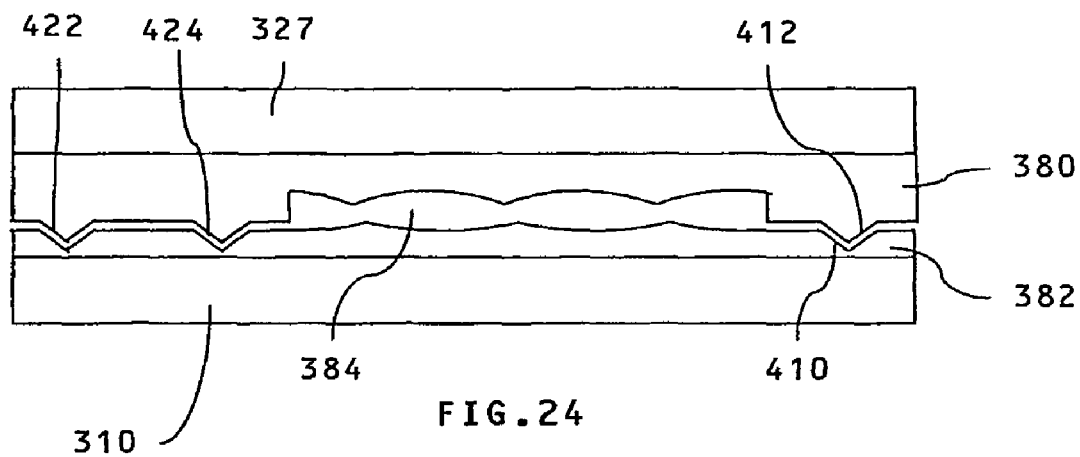
FIG. 24 shows the use of alignment features to align the first and second substrates of the display.
Figure 25:
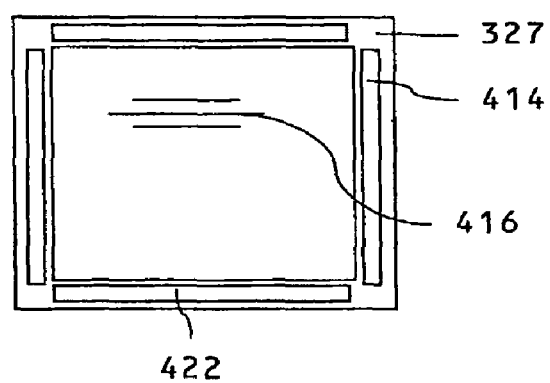
FIG. 25 shows the positioning of the alignment artifacts of FIG. 24.
Figure 25:
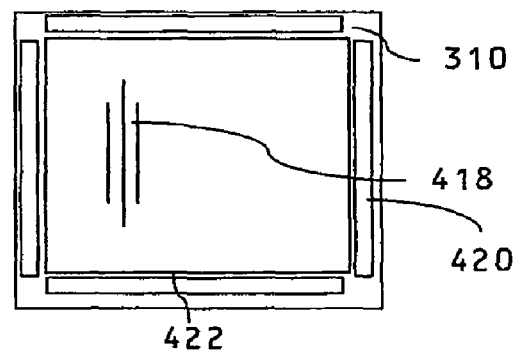

The features may advantageously be repetitive features with pitches the same as the lens pitch in the particular direction. Thus for example the pitch of features 422,424 in FIG. 24 is the same as the lens pitch of lenses 380. Alternatively, the features may have be two dimensional structures to constrain the relative position of the two components in both first and second directions. The alignment features may be incorporated in the lens master, and thus may be replicated at low cost. Such structures advantageously remove the need for a high tolerance alignment step between the two lenses, and thus reduce the cost of manufacture of the system.

When the second substrate is a parallax barrier component and the first substrate is a lenticular screen, it may be possible to use alignment fiducials on each substrate to complete the alignment between the two layers. The lens may incorporate optical imaging function which cooperates with fiducials on the parallax barrier to produce a signal for automatic alignment of the two components.

Thus, in a further aspect of the invention, alignment features may be configured with the same pitch as the optical structures, first features providing alignment in a first direction and second features providing alignment in a second direction, in which the pitch of the features in first and second directions is the same as the pitch of the optical structures in the first and second direction respectively.

The alignment elements may further be positioned on a first parallax barrier surface and a second lens surface.

In the above-described embodiments, the liquid crystal material used in the various parallax elements may be a liquid crystal or a liquid crystal gel, for example. A liquid crystal gel may comprise a network of polymer material and a liquid crystal material. The polymer material may be a liquid crystal polymer material. In the case of a passive birefringent lens, the liquid crystal material may be polymerised liquid crystal material.

In each of the above-described embodiments, the addressing of the elements may be modified so that over some areas, the display apparatus operates in the first mode and over areas the display apparatus operates in the second or third modes.

In the above-described embodiments incorporating an active parallax barrier comprising a switchable liquid crystal layer, the active parallax barrier may be replaced by a passive parallax barrier which comprises a patterned array of half-wave retarders and a switchable polarisation control device. Such a configuration has the advantage that the viewing distance of the display apparatus may be reduced as the retarders may be placed close the pixel plane of the spatial light modulator. The slit regions of such an element may not be independently addressable.

The invention claimed is:
1. A display apparatus comprising:
  a spatial light modulator;
  optical elements in series with the spatial light modulator and being switchable to provide:
  a first parallax element being a parallax barrier capable of directing light output from the display apparatus to form a first plurality of viewing windows; and
  a second parallax element capable of directing light output from the display apparatus to form a second plurality of viewing windows, wherein the first and second plurality of viewing windows are respectively arranged in two perpendicular orientations,
  the optical elements being switchable to operate in a first mode in which the first and second parallax elements have substantially no directional effect on the light output from the display apparatus, a second mode in which the first parallax element directs light output from the display apparatus into the first plurality of viewing windows and the second optical element has substantially no directional effect on the light output from the display apparatus and a third mode in which the first parallax element has substantially no directional effect on the light output from the display apparatus and the second optical element directs light output from the display apparatus into the second plurality of viewing windows.

2. A display apparatus according to claim 1, wherein the first and second parallax elements are formed separately and both arranged on the output side of the spatial light modulator with no polariser between the first and second parallax elements.

3. A display apparatus according to claim 2, wherein the first parallax element is an active parallax barrier comprising a layer of liquid crystal material and electrodes for applying an electric field across the layer of liquid crystal material and patterned to provide addressable barrier regions arranged alternating with slits so that light passing through the slits is directed into the first plurality of windows, the display apparatus having a polariser on the output side of the first parallax element to act as an analyser polariser.

4. A display apparatus according to claim 3, wherein the electrodes of the first parallax element are patterned to provide in the slits slit regions which are addressable independently from said barrier regions.

5. A display apparatus according to claim 3, wherein the electrodes of the first parallax element are not addressable in the slits.

6. A display apparatus according to claim 2, wherein the second parallax element is a birefringent lens array comprising a layer of isotropic material and a layer of birefringent material having a lens surface therebetween shaped to direct light output from the display apparatus into said second plurality of windows.

7. A display apparatus according to claim 6, wherein the birefringent lens array is an active birefringent lens array comprising a layer of birefringent material and electrodes for applying an electric field across the layer of birefringent material, the display apparatus being switchable between the first and third modes by switching of the voltage applied across said electrodes.

8. A display apparatus according to claim 6, wherein the birefringent lens array is a passive birefringent lens array which has substantially no directional effect on light of a first polarisation component and modifies the directional distribution of light of a second polarisation component, and the display apparatus further comprises a switchable polarisation control device arranged in series with the birefringent lens array and being switchable to control the polarisation of light passing through the display apparatus to selectively output from the display apparatus light of either the first polarisation component or the second polarisation component, the display apparatus being switchable between the first and third modes by switching of the switchable polarisation control device.

9. A display apparatus according to claim 6, wherein the first parallax element is arranged between the spatial light modulator and the second parallax element.

10. A display apparatus according to claim 3, wherein the second parallax element is an active parallax barrier comprising a layer of liquid crystal material and electrodes for applying an electric field across the layer of liquid crystal material and patterned to provide addressable barrier regions arranged alternating with slits so that light passing through the slits is directed into the second plurality of windows, both the first parallax element and the second parallax element being arranged between an input polariser and an analyser polariser.

11. A display apparatus according to claim 1, wherein said optical elements comprise: an input polariser; a birefringent lens comprising a layer of isotropic material and a layer of birefringent material having a lens surface therebetween shaped to direct light output from the display apparatus into said second plurality of windows; electrodes for applying an electric field across the layer of birefringent material and patterned to provide alternating, independently addressable slit regions and barrier regions arranged so that light passing through the slit regions is directed into said first plurality of windows; a switchable polarisation rotation element for selectively rotating the polarisation of light passing therethrough; and an analyser polariser, said birefringent lens constitutes both said first parallax element and said second parallax element.

12. A display apparatus according to claim 1, wherein: the spatial light modulator is capable of modulating light transmitted therethrough; the first parallax element is arranged on the input side of the spatial light modulator and the second parallax element is arranged on output side of the spatial light modulator.

13. A display apparatus according to claim 12, wherein the first parallax element is an active parallax barrier comprising a layer of liquid crystal material and electrodes for applying an electric field across the layer of liquid crystal material and patterned to provide addressable barrier regions alternating with slits and arranged so that light passing through the slits is directed into the first plurality of windows, the first parallax element having an input polariser on the input side thereof and an analysing polariser on the output side thereof.

14. A display apparatus according to claim 12, wherein the second parallax element is a birefringent lens array comprising a layer of isotropic material and a layer of birefringent material having a lens surface therebetween shaped to direct light output from the display apparatus into said second plurality of windows.

15. A display apparatus according to claim 14, wherein the birefringent lens array is an active birefringent lens array comprising a layer of birefringent material and a layer electrodes for applying an electric field across the layer of birefringent material, the display apparatus being switchable between the first and third modes by switching of the voltage applied across said electrodes.

16. A display apparatus according to claim 14, wherein the birefringent lens array is a passive birefringent lens array and the display apparatus further comprises a switchable polarisation control device arranged in series with the birefringent lens array and being switchable to control the polarisation of light passing through the display apparatus to selectively output from the display apparatus light of either a first polarisation component or a second polarisation component, the birefringent lens array having substantially no directional effect on light of the first polarisation component and modifying the directional distribution of light of the second polarisation component, the display apparatus being switchable between the first and third modes by switching of the switchable polarisation control device.

17. A display apparatus according to claim 1, wherein the display apparatus is used in a portrait orientation in the second mode for displaying images with portrait aspect ratio, and wherein the display apparatus is rotated to a landscape orientation in the third mode for displaying images with landscape aspect ratio.

18. A display apparatus according to claim 6, wherein lenses of the lens array are arranged along a first direction, the barrier regions and the slits being arranged in a second direction orthogonal to the first direction.

19. A display apparatus according to claim 10, wherein lenses of the lens array are arranged along a first direction, the barrier regions and the slits being arranged in a second direction orthogonal to the first direction.

20. A display apparatus according to claim 14, wherein lenses of the lens array are arranged along a first direction, the barrier regions and the slits being arranged in a secondforth direction orthogonal to the first direction.

21. A display apparatus comprising:
a spatial light modulator;
a first parallax element being a parallax barrier capable of directing light output from the display apparatus to form a first plurality of viewing windows; and
a second parallax element capable of directing light output from the display apparatus to form a second plurality of viewing windows, wherein the first and second plurality of viewing windows are respectively arranged in two perpendicular orientations,
the first and second parallax elements both being arranged in series with the spatial light modulator and on the same side of the spatial light modulator with no polariser between the first and second parallax elements,
the first and second parallax elements being switchable to operate in a first mode in which the first and second parallax elements have substantially no directional effect on the light output from the display apparatus, a second mode in which the first parallax element directs light output from the display apparatus into the first plurality of viewing windows and the second optical element has substantially no directional effect on the light output from the display apparatus and a third mode in which the first parallax element has substantially no directional effect on the light output from the display apparatus and the second optical element directs light output from the display apparatus into the second plurality of viewing windows.

22. A display apparatus according to claim 21, wherein the display apparatus is used in a portrait orientation in the second mode for displaying images with portrait aspect ratio, and wherein the display apparatus is rotated to a landscape orientation in the third mode for displaying images with landscape aspect ratio.

23. A display apparatus comprising a spatial light modulator having arranged in series therewith:
an input polariser;
a birefringent lens comprising a layer of isotropic material and a layer of birefringent material having a lens surface therebetween shaped to direct light output from the display apparatus into a second plurality of windows;
electrodes for applying an electric field across the layer of birefringent material and patterned to provide alternating, independently addressable slit regions and barrier regions arranged so that light passing through the slit regions is directed into a first plurality of windows perpendicular to the second plurality of viewing windows;
a switchable polarisation rotation element for selectively rotating the polarisation of light passing therethrough; and
an analyser polariser,
the display apparatus being switchable by control of the voltage applied to the electrodes and of the switchable polarisation rotation element to operate in a first mode in which the birefringent lens has substantially no directional effect on the light output from the display apparatus, a second mode in which light is output from the apparatus through the slit regions but not the barrier regions into the first plurality of viewing windows and the lens surface has substantially no directional effect on the light output from the display apparatus and a third mode in which the lens surface directs light output from the display apparatus into the second plurality of viewing windows across the entirety of the slit regions and barrier regions.

24. A display apparatus according to claim 23, wherein the first and second plurality of viewing windows are respectively arranged in two perpendicular orientations.

25. A display apparatus according to claim 23, wherein the display apparatus is used in a portrait orientation in the second mode for displaying images with portrait aspect ratio, and wherein the display apparatus is rotated to a landscape orientation in the third mode for displaying images with landscape aspect ratio.

26. A display apparatus according to claim 23, wherein the lens surface is shaped as an array of cylindrical lenses, which extend substantially orthogonally to each other and are arranged along a first direction, and wherein the barrier regions and the slit regions are arranged in a second direction orthogonal to the first direction.

27. A display apparatus comprising:
a spatial light modulator is capable of modulating light transmitted therethrough;
a first parallax element being a parallax barrier capable of directing light output from the display apparatus into a first plurality of viewing windows and being arranged on the input side of the spatial light modulator; and
a second parallax element capable of directing light output from the display apparatus into a second plurality of viewing windows pendicular to the first plurality of viewing windows and being arranged on the output side of the spatial light modulator,
the first and second parallax elements being switchable to operate in a first mode in which the first and second parallax elements have substantially no directional effect on the light output from the display apparatus, a second mode in which the first parallax element directs light output from the display apparatus into the first plurality of viewing windows and the second optical element has substantially no directional effect on the light output from the display apparatus and a third mode in which the first parallax element has substantially no directional effect on the light output from the display apparatus and the second optical element directs light output from the display apparatus into the second plurality of viewing windows.

28. A display apparatus according to claim 27, wherein the display apparatus is used in a portrait orientation in the second mode for displaying images with portrait aspect ratio, and wherein the display apparatus is rotated to a landscape orientation in the third mode for displaying images with landscape aspect ratio.

29. A display apparatus according to claim 27, wherein the first and second plurality of viewing windows are respectively arranged in two perpendicular orientations.

* * * * *